(12) United States Patent
Ahmavaara

(10) Patent No.: US 11,758,409 B2
(45) Date of Patent: Sep. 12, 2023

(54) SYSTEMS AND METHODS FOR DYNAMICALLY ALLOCATING SPECTRUM AMONG CROSS-INTERFERING RADIO NODES OF WIRELESS COMMUNICATIONS SYSTEMS

(71) Applicant: Corning Optical Communications LLC, Charlotte, NC (US)

(72) Inventor: Kalle Ahmavaara, Los Angeles, CA (US)

(73) Assignee: Corning Optical Communications LLC, Charlotte, NC (US)

( * ) Notice: Subject to any disclaimer, the term of this patent is extended or adjusted under 35 U.S.C. 154(b) by 68 days.

(21) Appl. No.: 17/350,647

(22) Filed: Jun. 17, 2021

(65) Prior Publication Data
US 2021/0314781 A1 Oct. 7, 2021

Related U.S. Application Data

(63) Continuation of application No. 16/534,727, filed on Aug. 7, 2019, now abandoned, which is a
(Continued)

(51) Int. Cl.
*H04W 72/04* (2023.01)
*H04W 16/14* (2009.01)
(Continued)

(52) U.S. Cl.
CPC ........... *H04W 16/14* (2013.01); *H04W 24/08* (2013.01); *H04W 72/0453* (2013.01); *H04W 72/541* (2023.01)

(58) Field of Classification Search
CPC .... H04B 17/345; H04W 16/10; H04W 16/14; H04W 24/08; H04W 36/30; H04W 36/38;
(Continued)

(56) References Cited

U.S. PATENT DOCUMENTS

| 4,099,137 A | 7/1978 | Alm et al. |
| 9,271,278 B2 | 2/2016 | Heo et al. |

(Continued)

FOREIGN PATENT DOCUMENTS

EP 2894910 A1 7/2015

OTHER PUBLICATIONS

Advisory Action for U.S. Appl. No. 15/665,763, dated Dec. 31, 2018, 4 pages.
(Continued)

*Primary Examiner* — Frank Duong
(74) *Attorney, Agent, or Firm* — William D. Doyle

(57) ABSTRACT

Systems and methods for dynamic allocation of spectrum among cross-interfering radio nodes of wireless communications systems are disclosed. Multiple radio nodes may be deployed within a geographical region, and each radio node may support wireless communication over spectrum in which access is arbitrated by an external service not under the control of the operator of the radio node. Each radio node is configured to detect radio conditions which may indicate coexistence between the radio node and a neighboring radio node. A network entity associated with the radio node obtains radio condition information and determines a coexistence status between the radio node and the neighboring radio node, such as whether coexistence with the neighboring radio node is tolerable or intolerable. The network entity reports an indication of the coexistence status to a spectrum server, and the spectrum server reallocates the spectrum among the radio nodes.

11 Claims, 14 Drawing Sheets

Related U.S. Application Data continuation of application No. PCT/US2018/023636, filed on Mar. 21, 2018.

(60) Provisional application No. 62/475,767, filed on Mar. 23, 2017, provisional application No. 62/474,558, filed on Mar. 21, 2017.

(51) Int. Cl.
  *H04W 24/08* (2009.01)
  *H04W 72/0453* (2023.01)
  *H04W 72/541* (2023.01)

(58) Field of Classification Search
  CPC . H04W 52/243; H04W 52/244; H04W 72/04; H04W 72/0406; H04W 72/0446; H04W 72/0453; H04W 72/046; H04W 72/0473; H04W 72/08; H04W 72/082; H04W 72/085
  See application file for complete search history.

(56) References Cited

U.S. PATENT DOCUMENTS

| | | | |
|---|---|---|---|
| 9,544,761 | B2 | 1/2017 | Nama et al. |
| 9,888,481 | B2 | 2/2018 | Mueck et al. |
| 10,405,197 | B2 * | 9/2019 | Ashrafi ............ H04W 52/0206 |
| 10,492,079 | B2 | 11/2019 | Nama et al. |
| 10,506,444 | B2 * | 12/2019 | Srikanteswara ...... H04W 16/14 |
| 10,548,142 | B2 | 1/2020 | Mueck et al. |
| 10,631,274 | B2 * | 4/2020 | Sun ...................... H04W 36/30 |
| 2008/0200202 | A1 | 8/2008 | Montojo et al. |
| 2010/0034135 | A1 | 2/2010 | Kim et al. |
| 2011/0170517 | A1 | 7/2011 | Bakker et al. |
| 2011/0194630 | A1 | 8/2011 | Yang et al. |
| 2011/0244869 | A1 | 10/2011 | Olofsson et al. |
| 2012/0140660 | A1 | 6/2012 | Kang et al. |
| 2012/0176996 | A1 | 7/2012 | Kim et al. |
| 2013/0203350 | A1 | 8/2013 | Etchegoyen et al. |
| 2013/0295948 | A1 | 11/2013 | Ye et al. |
| 2014/0010171 | A1 | 1/2014 | Morrill et al. |
| 2014/0066055 | A1 | 3/2014 | Balakrishnan et al. |
| 2014/0126438 | A1 | 5/2014 | Zhu et al. |
| 2014/0211690 | A1 | 7/2014 | Nama et al. |
| 2014/0301371 | A1 | 10/2014 | Maeda et al. |
| 2015/0011219 | A1 | 1/2015 | Saily et al. |
| 2015/0237609 | A1 | 8/2015 | Sun |
| 2015/0373628 | A1 | 12/2015 | Hwang et al. |
| 2016/0014626 | A1 | 1/2016 | Yi et al. |
| 2016/0037406 | A1 | 2/2016 | Centonza et al. |
| 2016/0190707 | A1 | 6/2016 | Park et al. |
| 2016/0205534 | A1 | 7/2016 | Fujishiro et al. |
| 2016/0212624 | A1 | 7/2016 | Mueck et al. |
| 2016/0286449 | A1 | 9/2016 | Choi et al. |
| 2016/0295613 | A1 | 10/2016 | Wager et al. |
| 2017/0070312 | A1 | 3/2017 | Yi et al. |
| 2017/0188241 | A1 | 6/2017 | Mueck et al. |
| 2017/0195887 | A1 | 7/2017 | Jovancevic |
| 2017/0208454 | A1 | 7/2017 | Knisely et al. |
| 2017/0289960 | A1 | 10/2017 | Moustafa et al. |
| 2017/0295497 | A1 | 10/2017 | Macmullan et al. |
| 2017/0318470 | A1 | 11/2017 | Srikanteswara et al. |
| 2017/0331447 | A1 | 11/2017 | Lee et al. |
| 2018/0035301 | A1 * | 2/2018 | Nama ................... H04W 16/18 |
| 2018/0054237 | A1 | 2/2018 | Tseng et al. |
| 2018/0132111 | A1 | 5/2018 | Mueck et al. |
| 2018/0146380 | A1 | 5/2018 | Srikanteswara et al. |
| 2018/0270721 | A1 | 9/2018 | Cui et al. |
| 2019/0028900 | A1 | 1/2019 | Furuichi |
| 2019/0059000 | A1 | 2/2019 | Sun |
| 2019/0215698 | A1 | 7/2019 | Balachandran et al. |
| 2020/0314660 | A1 | 10/2020 | Sun |

OTHER PUBLICATIONS

Author Unknown, "Citizens Broadband Radio Service (CBRS) Shared Spectrum: An Overview," 2017, Federated Wireless, 4 pages.

Author Unknown, "Enterprise Private LTE," White Paper, SpiderCloud Wireless, 2017, Milpitas, California, SpiderCloud Wireless, Inc., 14 pages.

Author Unknown, "Signaling Protocols and Procedures for Citizens Broadband Radio Service (CBRS): Spectrum Access System (SAS)—Citizens Broadband Radio Service Device (CBSD)," Interface Technical Specification, Version 1.2.4, Jun. 26, 2019, Wireless Innovation Forum, The Software Defined Radio Forum Inc., 60 pages.

Author Unknown, "Technical Specification Group Radio Access Network; Evolved Universal Terrestrial Radio Access (E-UTRA) and Evolved Universal Terrestrial Radio Access Network (E-UTRAN); Overall description; Stage 2 Release 13)," Technical Specification 36.300, Version 13.4.0, 3GPP Organizational Partners, Jun. 2016, 310 pages.

Author Unknown, "Technical Specification Group Radio Access Network; Evolved Universal Terrestrial Radio Access (E-UTRA); Radio Resource Control (RRC); Protocol specification (Release 14)," Technical Specification 36.331, Version 14.3.0, Jun. 2017, 3GPP Organizational Partners, 745 pages.

Brown, Bob, "FAQ: What in the wireless world is CBRS?," Network World, Mar. 14, 2017, IDG Communications, Inc., 4 pages.

European Patent Application No. 18716470.2; Communication pursuant to Article 94(3) EPC dated Oct. 15, 2020; 10 pages; European Patent Office.

Final Office Action for U.S. Appl. No. 13/752,358, dated Mar. 31, 2016, 21 pages.

Final Office Action for U.S. Appl. No. 15/665,763, dated Oct. 9, 2018, 11 pages.

Final Office Action for U.S. Appl. No. 15/815,248, dated Sep. 19, 2019, 15 pages.

Hwang, Yitaek, "What is CBRS?—LTE in 3.5 GHz Shared Spectrum and What it Means for IoT," iotforall.com/what-is-cbrs-lte-3-5-ghzl, Jun. 9, 2018, 8 pages.

International Preliminary Report on Patentability for International Patent Application No. PCT/US2018/023636, dated Oct. 3, 2019, 9 pages.

International Preliminary Report on Patentability of the International Searching Authority; PCT/US2018/023636; dated Oct. 3, 2019; 9 Pages; European Patent Office.

International Search Report and Written Opinion for International Patent Application No. PCT/2018/023636, dated Jun. 8, 2018, 11 pages.

International Search Report and Written Opinion of the International Searching Authority; PCT/US2018/023636; dated Jun. 8, 2018; 10 Pages; European Patent Office.

Mueck, Markus, et al., "Spectrum Sharing: Licensed Shared Acccess (LSA) and Spectrum Access System (SAS)," While Paper, Version 1.0, Oct. 2015, Intel, 27 pages.

Non-Final Office Action for U.S. Appl. No. 13/752,358, dated Jan. 15, 2015, 21 pages.

Non-Final Office Action for U.S. Appl. No. 13/752,358, dated Jul. 29, 2015, 30 pages.

Non-Final Office Action for U.S. Appl. No. 15/665,763, dated Mar. 1, 2019, 11 pages.

Non-Final Office Action for U.S. Appl. No. 15/815,248, dated Mar. 26, 2019, 14 pages.

Non-Final Office Action for U.S. Appl. No. 15/815,248, dated Sep. 7, 2018, 12 pages.

Non-Final Office Action for U.S. Appl. No. 16/665,763, dated Jun. 1, 2018, 9 pages.

Notice of Allowance and Examiner-Initiated Interview Summary for U.S. Appl. No. 13/752,358, dated Aug. 31, 2016, 11 pages.

Notice of Allowance for U.S. Appl. No. 15/665,763, dated Jul. 17, 2019, 8 pages.

(56) References Cited

OTHER PUBLICATIONS

Notice of Allowance for U.S. Appl. No. 15/815,248, dated May 7, 2020, 8 pages.
Parvez et al, CBRS Spectrum Sharing between LTE-U and WiFi: A Multiarmed Bandit Approach, Hindawi, 13 pages, 2016.

* cited by examiner

| LOWER 100 MHz SECTION 102 | UPPER 50 MHz SECTION 104 |
|---|---|
| TIER 1: INCUMBENTS (NAVY RADARS AND FSS SPACE-TO-EARTH STATIONS) | TIER 1: INCUMBENTS (MAINLY PtP FIXED WIMAX LINKS @ 25,000 KNOWN LOCATIONS) |
| TIER 2: CBRS PRIORITY ACCESS LICENSEES | TIER 2: CBRS GAA (AFTER A TRANSITION PERIOD OF ABOUT 5 YEARS, ONE MODEL WILL APPLY, AND INCUMBENTS WILL RE-CLASSIFIED AS GAA) |
| TIER 3: CBRS GENERIC AUTHORIZED ACCESS (GAA) | |

SYSTEMS AND METHODS FOR DYNAMICALLY ALLOCATING SPECTRUM AMONG CROSS-INTERFERING RADIO NODES OF WIRELESS COMMUNICATIONS SYSTEMS

PRIORITY APPLICATIONS

This application is a continuation of U.S. patent application Ser. No. 16/534,727, filed Aug. 7, 2019, which is a continuation of International Application No. PCT/US2018/023636, filed Mar. 21, 2018, which claims the benefit of priority under 35 U.S.C. § 119 to U.S. Provisional Patent Application No. 62/475,767, filed Mar. 23, 2017, and to U.S. Provisional Patent Application No. 62/474,558, filed Mar. 21, 2017, which are incorporated herein by reference in their entireties.

RELATED APPLICATIONS

The present application is related to U.S. patent application Ser. No. 15/665,763 entitled "SYSTEM AND METHOD FOR CBRS DUAL CELL RADIO NODE" filed Aug. 1, 2017, now U.S. Pat. No. 10,492,079, which is incorporated herein by reference in its entirety.

The present application is also related to U.S. Pat. No. 9,544,761 entitled "USE OF A COMMON PHYSICAL CELL IDENTITY IN A SMALL CELL NETWORK" filed Jan. 28, 2013, which is incorporated herein by reference in its entirety.

BACKGROUND

The disclosure relates generally to wireless communications systems and related networks, such as Universal Mobile Telecommunications Systems (UMTSs), its offspring Long Term Evolution (LTE) and $5^{th}$ Generation New Radio (5G-NR) described and being developed by the Third Generation Partnership Project (3GPP), and more particularly to dynamically allocating spectrum among cross-interfering radio access networks (RANs).

Operators of mobile systems, such as UMTS and its offspring including LTE and LTE-Advanced, are increasingly relying on wireless macrocell RANs (e.g., traditional cellular base stations), along with wireless small cell RANs in order to deploy, for example, indoor voice and data services to enterprises and other customers. Such small cell RANs typically utilize multiple-access technologies capable of supporting communications with multiple users using radio frequency (RF) signals and sharing available system resources such as bandwidth and transmit power. Evolved universal terrestrial radio access (E-UTRA) is the radio interface of 3GPP's LTE upgrade path for UMTS mobile networks. In these systems, there are different frequencies where LTE (or E-UTRA) can be used, and in such systems, user mobile communications devices connect to a serving system, which is represented by a cell.

For both macrocell RANs and small cell RANs, increasing demands for wireless throughput make access to additional wireless spectrum desirable. An example of additional spectrum which is becoming available is the citizens broadband radio service (CBRS). The CBRS is a band now used primarily by Navy radars in coastal areas as well as PtP WiMax links at 25,000 locations.

For example, FIG. 1A illustrates a 150 MegaHartz (150 MHz) frequency band 100 between 3.55 GHz and 3.70 GHz to which the Federal Communications Commission (FCC) is opening access as the CBRS. As shown in FIG. 1B, the overall 150 MHz CBRS frequency band 100 is currently divided into a lower 100 MHz section 102 and an upper 50 MHz section 104, with the lower 100 MHz section 102 being used by Navy radars in coastal areas and space-to-earth fixed-satellite service (FSS) stations. The upper 50 MHz section 104 is currently used by WiMax fixed wireless baseband services, three ground radar stations, eighty-six grandfathered space-to-earth FSS stations, and Navy radar for ships located further than 44 miles from the coast.

However, as illustrated in FIG. 1C, the FCC is opening up fifteen (15) 10-MHz unpaired channels 106(1)-106(15) for radio services through citizens broadband radio service devices (CBSDs), which are devices configured to operate within the CBRS frequencies and according to CBRS rules. The CBSDs, or parts thereof, may be incorporated in radio nodes within RANs along with other devices and networks. In this regard as illustrated in FIG. 1C, in the new CBRS framework, the 150 MHz CBRS frequency band 100 will be divided into fifteen 10-MHz channels 106(1)-106(15). Other divisions are also possible and a division to fifteen 10-MHz channels 106(1)-106(15) is illustrated as an example of one possible division. Channels 106(1)-106(10) in the lower 100 MHz section 102 will operate according to a three-tier model, and channels 106(11)-106(15) in the upper 50 MHz section 104 will operate according to a two-tier model, as illustrated further with respect to FIG. 2A.

As illustrated in FIG. 2A, under the three-tier model of the lower 100 MHz section 102, incumbent users, such as the Navy and existing PtP links, will have a first tier priority access to the CBRS frequencies. A second tier priority access will be granted to CBSDs (possibly implemented within entities such as radio nodes in RANs or other networks) operating with priority access licenses (PALs)—these are generally three-year renewable licenses per census tract. A third tier priority access will be granted to CBSDs operating according to a Generic Authorized Access (GAA) model, which is based on a license-by-rule framework. The upper 50 MHz section 104 will operate according to a two-tier model, in which incumbents will be granted first tier priority access and RANs will be granted second tier priority access according to a GAA model.

The PALs are only available for the lower 100 MHz section 102 (see FIG. 2A), and will be allocated per census tract. It is noted in this regard that approximately 74,000 census tracts are in the US, and the design targets an optimal population of 4,000 for each tract. There will be a maximum of seven PAL licenses given for any census tract. One licensee can have at most four PAL licenses or channels 106(1)-106(15) in any given census tract. PAL licensing will be by a competitive bidding process every three years, with an automatic expiration after that time. For the very first licensing period, a PAL license must be acquired for six years. All PAL licenses will expire at the same time, so all PALs will be re-auctioned every three years. PAL licenses to a tract will be awarded only if there are more bidders than available PAL channels. Otherwise, no PAL licenses will be awarded, and all channels will be available as GAA.

GAA may potentially apply for the whole 150 MHz CBRS frequency band 100, i.e., up to 15 channels 106(1)-106(15). A "license by rule" framework will be applied. As stated by the FCC, there may be limited opportunities for CBRS users to deploy and utilize CBSDs in indoor areas without the permission of facility owners. In addition, the SAS can authorize GAA devices into PAL channels that are not used.

To control access to the CBRS frequency band 100 for RANs and other CBSD devices according to the new priority scheme in FIG. 2A, a new Spectrum Access System (SAS) 200(1)-200(X) will need to be provided, as illustrated in FIG. 2B. The new SAS 200(1)-200(X) will control access to the CBRS frequency band 100 according to various priorities, and CBSDs need to be authorized by the SAS 200(1)-200(X) in order to radiate in the allocated spectrum. The SAS 200(1)-200(X) will detect activity by incumbents (e.g., Navy radars), and will operate so as to vacate second and third tier CBSDs 202(1)-202(Y) from the channels needed for incumbent use, reallocating the remaining spectrum to the second and third tier CBSDs 202(1)-202(Y). That is, the SAS 200(1)-200(X) is responsible for installing or otherwise obtaining access to sensors so as to allow an environment sensing capability (ESC) 204. The SAS 200(1)-200(X) also accesses FCC databases 206 regarding PAL access to the spectrum.

The main functions of the SAS 200(1)-200(X) include incumbent protection and protection of PALs from GAA. To perform these functions, the FCC outlines a set of rules where the CBSDs 202(1)-202(Y) have to register with the SAS 200(1)-200(X) (in some cases, through a proxy or network manager 208), giving the SAS 200(1)-200(X) their location and other details. The SAS 200(1)-200(X) then allocates channels that PAL and GAA users can access. End user terminals 210(1)-210(Z) wait for authorization from their corresponding CBSDs 202(1)-2042(Y) before transmitting in the CBRS frequency band 100.

Each CBSD, such as a radio node, operating within the CBRS frequency band 100 will transmit and receive wireless data within a respective coverage area. It is expected that at least some CBSDs, whether operating under the PAL or GAA scheme, will have overlapping coverage areas. CBSDs with overlapping coverage areas are likely to cause RF cross-interference, which may require CBRS spectrum to be divided or reallocated among the CBSDs.

No admission is made that any reference cited herein constitutes prior art. Applicant expressly reserves the right to challenge the accuracy and pertinency of any cited documents.

SUMMARY

Embodiments of the disclosure relate to systems and methods for dynamically allocating spectrum among cross-interfering radio nodes of wireless communications systems. As examples, a radio node that is configured to support dynamic allocation of spectrum among cross-interfering radio nodes may be within a macrocell radio access network (RAN) (e.g., a traditional cellular base station) or a small cell RAN (e.g., a RAN deployed in an enterprise environment). As an example, multiple radio nodes may be deployed within a geographical region, and may further be deployed within multiple RANs or similar networks. Each radio node may support wireless communication over unlicensed spectrum, shared spectrum, spectrum licensed from a third party, or other spectrum in which access is arbitrated by an external service not under the control of the operator of the radio node. An example of such arbitrated spectrum is spectrum associated with citizens broadband radio service (CBRS). In this regard, in aspects disclosed herein, systems and methods are deployed for allocating the arbitrated spectrum among cross-interfering radio nodes, which may be citizens broadband radio service devices (CBSDs).

A radio node operating in an arbitrated spectrum (such as CBRS) may be capable of communicating wirelessly with user devices (e.g., mobile devices) within a given coverage area. In this regard as disclosed herein, the radio node can be configured to detect radio conditions indicating coexistence within a neighboring radio node (e.g., radio interference within its coverage area caused by the presence of the neighboring radio node). When the radio condition is detected, the radio node or another network entity associated with the radio node may determine a coexistence status between the radio node and the neighboring radio node (e.g., whether the interference is tolerable, such that the radio node may communicate effectively within its coverage area in spite of the neighboring radio node). For example, detected radio interference from the neighboring radio node may be minimal and/or limited to an outer limit of the radio node's coverage area, and the coexistence status indicates that the neighboring radio node is tolerable. As another example, the radio interference may occur in a portion of the radio node's coverage area having no user devices present. However, when the radio node cannot (or is assumed not to be able to) operate over a shared frequency range with the neighboring radio node, the coexistence status indicates that the neighboring radio node is intolerable. After a coexistence status is determined, the radio node or another network entity associated with the radio node transmits an indication of the coexistence status (such as a tolerability declaration or an intolerability declaration) to an arbitrating server, such as a spectrum server. The arbitrating server (e.g., spectrum server) may be part of the spectrum access system (SAS) or it could be a logically separate server such as a coexistence management server. There may be one or several spectrum servers. After receiving all such tolerability and/or intolerability declarations, the arbitrating server allocates or otherwise facilitates spectrum access among the radio nodes in order to avoid or minimize intolerable interference between any two radio nodes. For example, in a situation where no intolerability declarations are received, all radio nodes may gain access to the entire arbitrated spectrum (subject to any other priority determinations). As another example, if an intolerability declaration is made between two radio nodes, each radio node can be allocated half of the available arbitrated spectrum.

In one exemplary aspect, a method of reporting coexistence status between radio nodes to a spectrum server is provided. The method includes obtaining radio condition information. The method also includes determining a coexistence status between a first radio node and a second radio node based on the radio condition information. The method also includes transmitting an indication of the coexistence status to a spectrum server.

An additional embodiment of the disclosure relates to a method of facilitating access to a plurality of radio frequency channels. The method includes receiving from a network entity an indication of a coexistence status between a first radio node associated with the network entity and a second radio node. The method also includes facilitating access to a plurality of radio frequency channels between the first radio node and the second radio node based on the indication of the coexistence status.

An additional embodiment of the disclosure relates to a method of requesting access to a plurality of radio frequency ranges shared by a plurality of RANs. The method includes detecting a radio condition indicating potential interference between a first RAN and a second RAN of a plurality of RANs. The method also includes determining whether the potential interference is intolerable interference based on the detected radio condition. The method also includes transmitting an intolerability declaration to a server in response to the determined potential interference indicating intolerable interference. The method also includes receiving an allocation of a first radio frequency range of the plurality of radio frequency ranges in response to the transmitted intolerability declaration. The method also includes accessing the first radio frequency range of the plurality of radio frequency ranges in accordance with the allocation of the first radio frequency range.

An additional embodiment of the disclosure relates to a serving cell in a first RAN. The serving cell includes a transmitter circuit configured to transmit a communications signal to a user mobile communications device. The serving cell also includes a receiver circuit configured to receive communications signals from the user mobile communications device. The serving cell also includes a communication interface circuit configured to exchange data with a server. The serving cell also includes a processor circuit communicatively coupled to the transmitter circuit, the receiver circuit, and the communication interface circuit. The processor circuit is configured to detect a radio condition indicating potential interference between the serving cell in the first RAN and a nearby serving cell in a second RAN. The processor circuit is also configured to determine whether the potential interference is intolerable interference based on the detected radio condition. The processor circuit is also configured to control the communication interface circuit to transmit an intolerability declaration to the server in response to the determined potential interference indicating intolerable interference. The processor circuit is also configured to receive an indication to communicate over a radio frequency range in response to the transmitted intolerability declaration. The processor circuit is also configured to configure the transmitter circuit to transmit the communications signals over the radio frequency range.

An additional embodiment of the disclosure relates to a method of allocating a plurality of radio frequency ranges among a plurality of RANs. The method includes receiving a request for access to the plurality of frequency ranges from the plurality of RANs. The method also includes receiving one or more intolerability declarations, each intolerability declaration indicating an intolerable interference between a respective first RAN and a respective second RAN of the plurality of RANs. The method also includes dividing access to the plurality of radio frequency ranges among the plurality of RANs such that for each intolerability declaration the intolerable interference is avoided.

An additional embodiment of the disclosure relates to a server. The server includes a communication interface circuit configured to exchange data with a plurality of RANs. The server also includes a processor circuit communicatively coupled to the communication interface circuit. The processor circuit is configured to receive an intolerability declaration from a first RAN of the plurality of RANs, the intolerability declaration indicating an intolerable interference between the first RAN and a neighboring second RAN of the plurality of RANs. The processor circuit is also configured to divide access to a plurality of radio frequency ranges among the plurality of RANs such that the first RAN and the neighboring second RAN do not share any radio frequency range of the plurality of radio frequency ranges.

Additional features and advantages will be set forth in the detailed description which follows and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding of the disclosure, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 2A is a table illustrating a three-tier model under which channels in the lower 100 MHz section of the CBRS of FIGS. 1A-1C will operate, and a two-tier model under which channels in the upper 50 MHz section of the CBRS will operate;

DETAILED DESCRIPTION

Figure 1A:
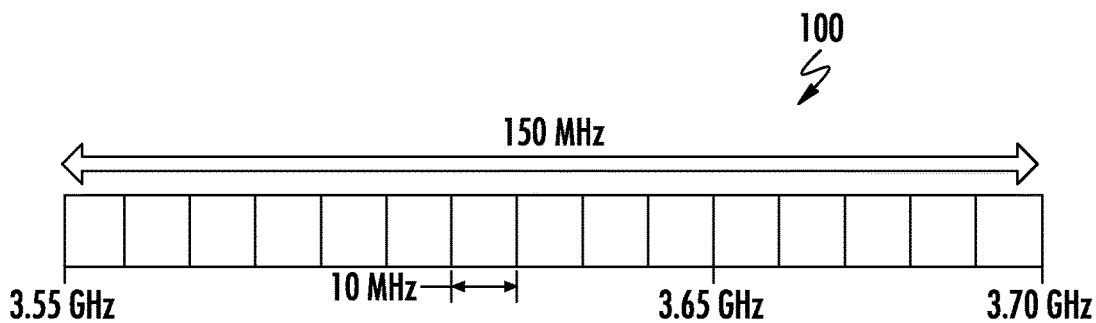
FIGS. 1A-1C illustrate existing and proposed spectrum allocation schemes within the citizens broadband radio service (CBRS)
Figure 1B:
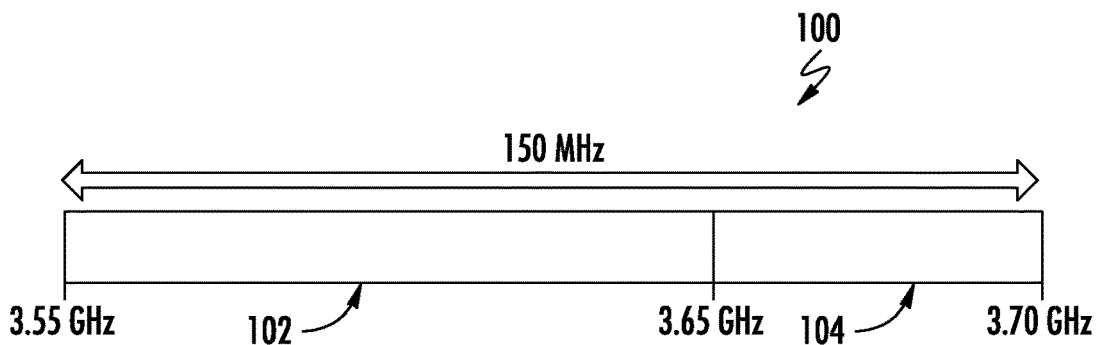

Embodiments of the disclosure relate to systems and methods for dynamically allocating spectrum among cross-interfering radio nodes of wireless communications systems. As examples, a radio node that is configured to support dynamic allocation of spectrum among cross-interfering radio nodes may be within a macrocell radio access network (RAN) (e.g., a traditional cellular base station) or a small cell RAN (e.g., a RAN deployed in an enterprise environment). As an example, multiple radio nodes may be deployed within a geographical region, and may further be deployed within multiple RANs or similar networks. Each radio node may support wireless communication over unlicensed spectrum, shared spectrum, spectrum licensed from a third party, or other spectrum in which access is arbitrated by an external service not under the control of the operator of the radio node. An example of such arbitrated spectrum is spectrum associated with citizens broadband radio service (CBRS). In this regard, in aspects disclosed herein, systems and methods are deployed for allocating the arbitrated spectrum among cross-interfering radio nodes, which may be citizens broadband radio service devices (CBSDs).

A radio node operating in an arbitrated spectrum (such as CBRS) may be capable of communicating wirelessly with user devices (e.g., mobile devices) within a given coverage area. In this regard as disclosed herein, the radio node can be configured to detect radio conditions indicating coexistence within a neighboring radio node (e.g., radio interference within its coverage area caused by the presence of the neighboring radio node). When the radio condition is detected, the radio node or another network entity associated with the radio node may determine a coexistence status between the radio node and the neighboring radio node (e.g., whether the interference is tolerable, such that the radio node may communicate effectively within its coverage area in spite of the neighboring radio node). For example, detected radio interference from the neighboring radio node may be minimal and/or limited to an outer limit of the radio node's coverage area, and the coexistence status indicates that the neighboring radio node is tolerable. As another example, the radio interference may occur in a portion of the radio node's coverage area having no user devices present. However, when the radio node cannot (or is assumed not to be able to) operate over a shared frequency range with the neighboring radio node, the coexistence status indicates that the neighboring radio node is intolerable. After a coexistence status is determined, the radio node or another network entity associated with the radio node transmits an indication of the coexistence status (such as a tolerability declaration or an intolerability declaration) to an arbitrating server, such as a spectrum server. The arbitrating server (e.g., spectrum server) may be part of the spectrum access system (SAS) or it could be a logically separate server such as a coexistence management server. There may be one or several spectrum servers. After receiving all such tolerability and/or intolerability declarations, the arbitrating server allocates or otherwise facilitates spectrum access among the radio nodes in order to avoid or minimize intolerable interference between any two radio nodes. For example, in a situation where no intolerability declarations are received, all radio nodes may gain access to the entire arbitrated spectrum (subject to any other priority determinations). As another example, if an intolerability declaration is made between two radio nodes, each radio node can be allocated half of the available arbitrated spectrum.

Figure 3:
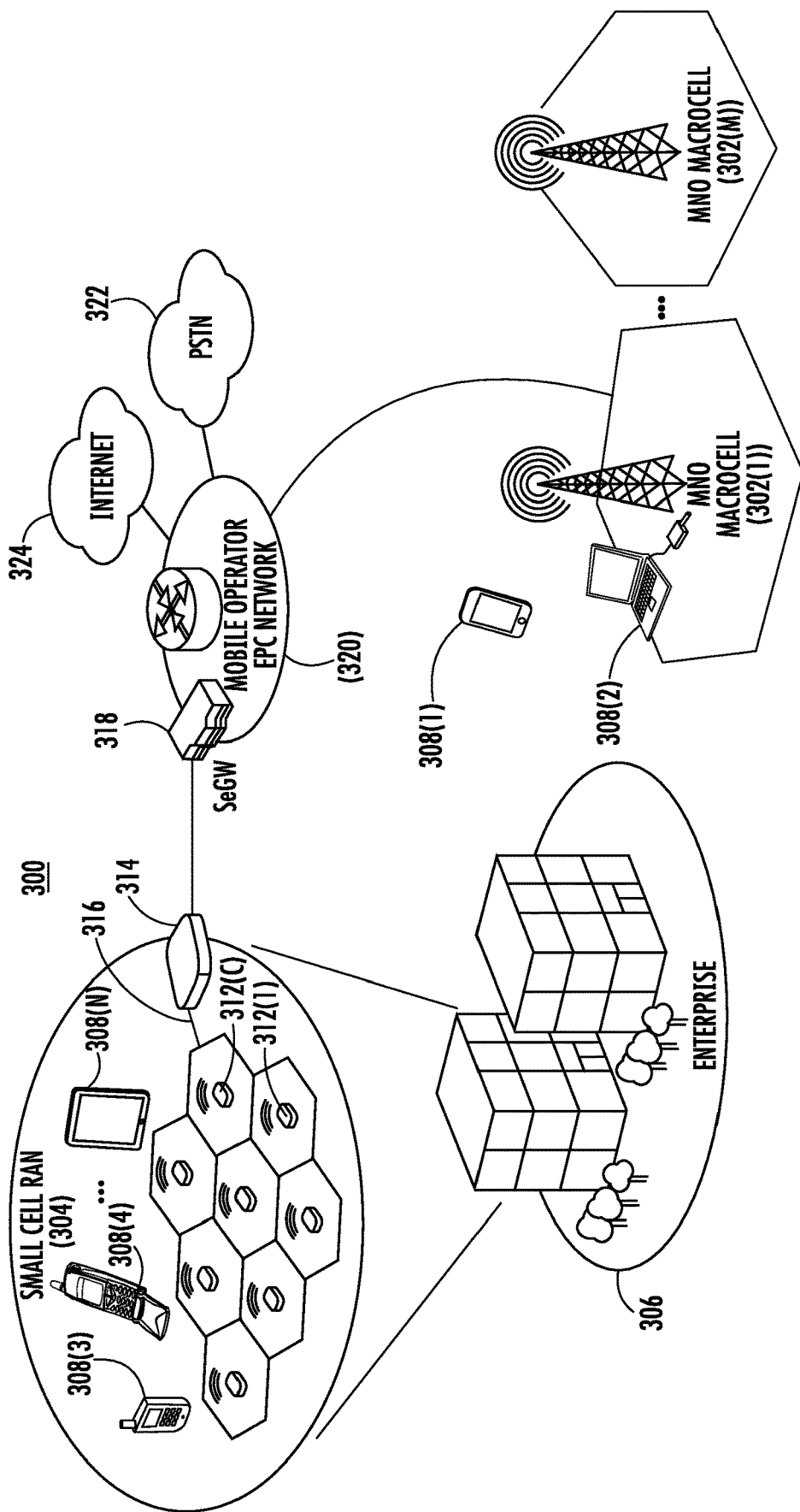
FIG. 3 is a schematic diagram of an exemplary mobile telecommunications environment that includes an exemplary macrocell radio access network (RAN) and an exemplary small cell RAN located within an enterprise environment and configured to service mobile communications between a user mobile communications device to a mobile network operator (MNO), wherein the RANs include radio nodes configured to access an arbitrated radio frequency spectrum and dynamically allocate the spectrum in response to detected cross-interference with a neighboring radio node.

In this regard, FIG. 3 is a schematic diagram of an exemplary mobile telecommunications environment 300 (also referred to as "environment 300") that includes exemplary macrocell RANs 302(1)-302(M) ("macrocells 302(1)-302(M)") and an exemplary small cell RAN 304 located within an enterprise environment 306 and configured to service mobile communications between a user mobile communications device 308(1)-308(N) to a mobile network operator (MNO) 310. As discussed above and in more detail below, at least one of the macrocell RANs 302(1)-302(M) and/or the small cell RAN 304 includes a radio node configured as a CBSD which can service mobile communications between the user mobile communications device 308(1)-308(N) to the MNO 310 over the CBRS frequency band 100 (see FIG. 1C). The macrocell RANs 302(1)-302(M) and/or the small cell RAN 304 include at least one CBSD configured to detect radio conditions (such as potential interference) which can indicate coexistence with neighboring radio nodes (not shown) which are not part of the same access network (e.g., radio nodes which do not service mobile communications to the same MNO 310), or which otherwise are not mutually capable of operating within the same frequency ranges. A network entity associated with the CBSD radio node (e.g., the radio node or a domain proxy) determines a coexistence status (e.g., whether the potential interference is intolerable), and communicates the coexistence status with an arbitrating server so that the arbitrating server can reallocate channels within the CBRS frequency band 100 and avoid any intolerable coexistence status (e.g., an intolerable interference), as described further below with respect to FIGS. 5 and 7A-9.

A serving RAN for a user mobile communications device 308(1)-308(N) is a RAN or cell in the RAN in which the user mobile communications device 308(1)-308(N) have an established communications session with the exchange of mobile communications signals for mobile communications. Thus, a serving RAN may also be referred to herein as a serving cell. For example, the user mobile communications devices 308(3)-308(N) in FIG. 3 are being serviced by the small cell RAN 304, whereas user mobile communications devices 308(1), 308(2) are being serviced by the macrocells 302(1)-302(M). The macrocells 302(1)-302(M) are an MNO macrocells in this example.

In this regard, with reference to FIG. 3, the mobile telecommunications environment 300 in this example, is arranged as a Long Term Evolution (LTE) system as described by the Third Generation Partnership Project (3GPP) as an evolution of the Global System for Mobile Communication/Universal Mobile Telecommunications System (GSM/UMTS) standards. It is emphasized, however, that the aspects described herein may also be applicable to other network types and protocols. The mobile telecommunications environment 300 includes the enterprise environment 306 in which the small cell RAN 304 is implemented. The small cell RAN 304 includes a plurality of small cell radio nodes 312(1)-312(C). Each small cell radio node 312(1)-312(C) has a radio coverage area (graphically depicted in the drawings as a hexagonal shape) that is commonly termed a "small cell." A small cell may also be referred to as a femtocell, or using terminology defined by 3GPP as a Home Evolved Node B (HeNB). In the description that follows, the term "cell" typically means the combination of a radio node and its radio coverage area unless otherwise indicated.

The size of the enterprise environment 306 and the number of cells deployed in the small cell RAN 304 may vary. In typical implementations, the enterprise environment 306 can be from 50,000 to 500,000 square feet and encompass multiple floors, and the small cell RAN 304 may support hundreds to thousands of users using mobile communications platforms such as mobile phones, smartphones, tablet computing devices, and the like shown as the user mobile communications devices 308(3)-308(N). However, the foregoing is intended to be illustrative and the solutions described herein can be typically expected to be readily scalable either upwards or downwards as the needs of a particular usage scenario demand.

In FIG. 3, the small cell RAN 304 includes one or more services nodes (represented as a single services node 314 in FIG. 3) that manage and control the small cell radio nodes 312(1)-312(C). In alternative implementations, the management and control functionality may be incorporated into a small cell radio node 312(1)-312(C), distributed among nodes, or implemented remotely (i.e., using infrastructure external to the small cell RAN 304). The small cell radio nodes 312(1)-312(C) are coupled to the services node 314 over a direct or local area network (LAN) connection 316 as an example, typically using secure IPsec tunnels. The services node 314 aggregates voice and data traffic from the small cell radio nodes 312(1)-312(C) and provides connectivity over an IPsec tunnel to a security gateway (SeGW) 318 in an Evolved Packet Core (EPC) 320 network of the MNO 310. The EPC 320 is typically configured to communicate with a public switched telephone network (PSTN) 322 to carry circuit-switched traffic, as well as for communicating with an external packet-switched network such as the Internet 324.

Some or all of the macrocells 302(1)-302(M) can also be an Evolved Node B (eNB) base station. The radio coverage area of a macrocell 302(1)-302(M) is typically much larger than that of a small cell where the extent of coverage often depends on the base station configuration and surrounding geography. Thus, a given user mobile communications device 308(3)-308(N) in the small cell RAN 304 may achieve connectivity to the EPC network 320 through either a macrocell 302(1)-302(M) or small cell radio node 312(1)-312(C) in the small cell RAN 304 in the environment 300.

Figure 1C:
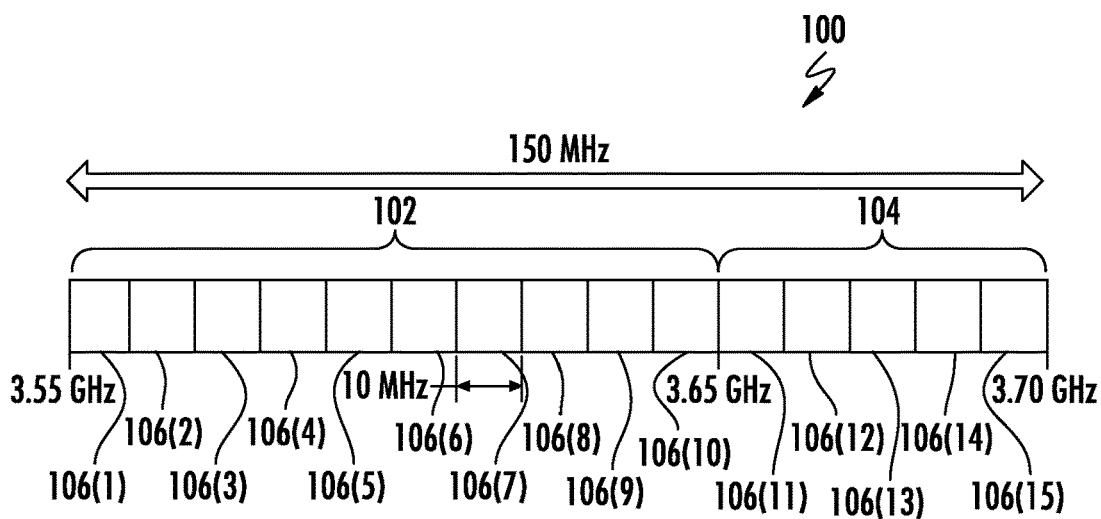
Figure 2B:
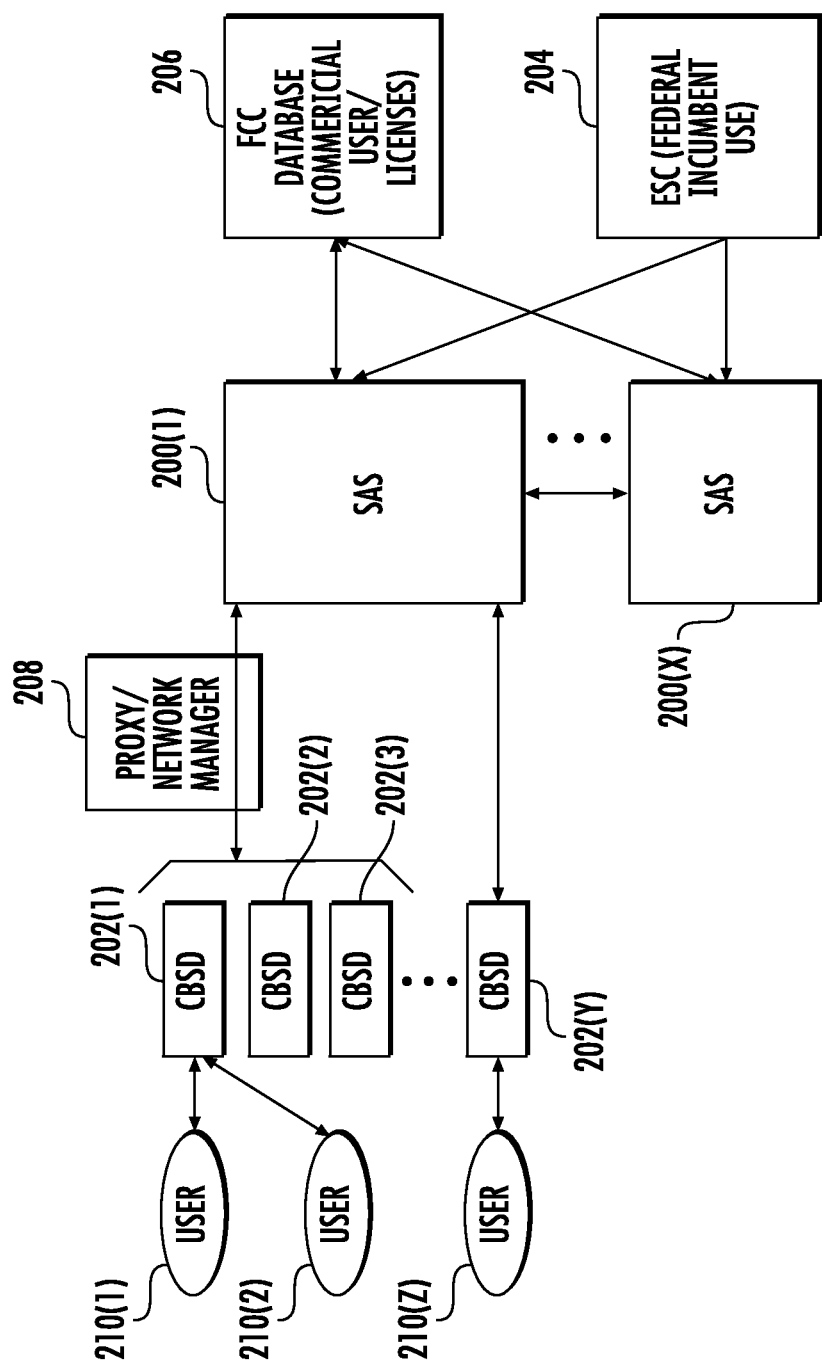
FIG. 2B is a schematic diagram of a spectrum access system to control access to the CBRS frequency band.

In aspects disclosed herein, the small cell radio nodes 312(1)-312(C), radio nodes in the macrocells 302(1)-302(M), and/or the user mobile communications devices 308(1)-308(N) serviced by their respective serving RANs are configured to detect radio conditions indicating coexistence with (e.g., potential interference from) neighboring radio nodes (not shown) which are not part of the same access network. In this regard, as an example, at least one of the small cell radio nodes 312(1)-312(C), the radio nodes in the macrocells 302(1)-302(M), and/or the user mobile communications devices 308(1)-308(N) may be configured to tune its receiver to scan one or more frequency ranges (e.g., bands) based on a scan frequency criteria to discover radio conditions which may indicate coexistence with (e.g., potential interference from) other neighbor radio access systems in communications range of the respective device 302(1)-302(M), 312(1)-312(C). In some embodiments, some or the entire 150-MHz CBRS frequency band 100 of FIG. 1C is scanned for potential interference. Any potential interference caused by a neighboring radio access system discovered according to the scanned frequency band(s) can be reported to the network entity which interfaces with an arbitrating server in a measurement report. Before discussing more exemplary aspects of detecting radio conditions indicating potential cross-interference, the environment 300 in regard to FIGS. 4A-4B is first discussed below.

Figure 4A:
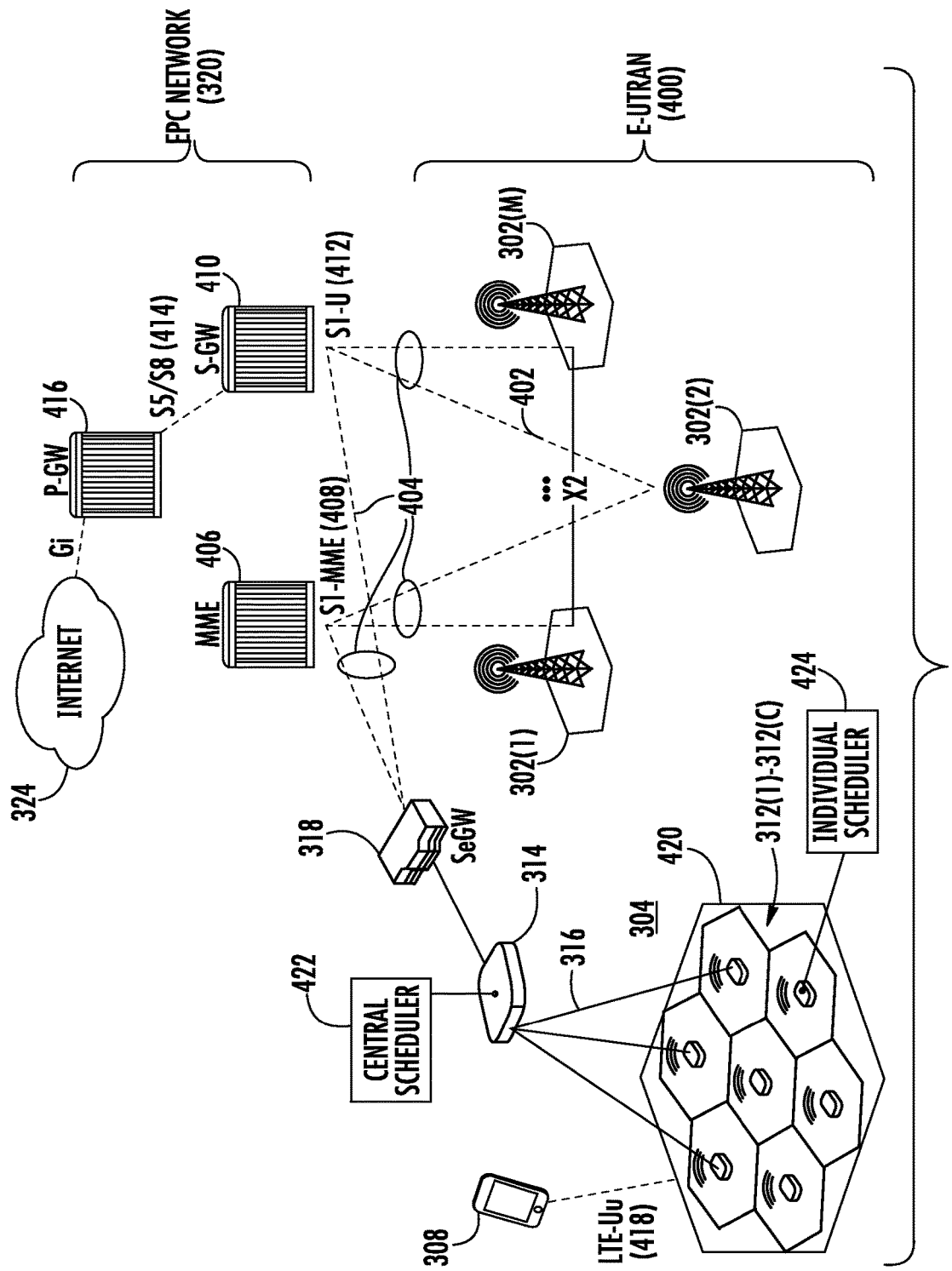
FIGS. 4A and 4B illustrate exemplary details of an evolved packet core (EPC) and Evolved Universal Mobile Telecommunications System (UMTS) Terrestrial Radio Access Network (E-UTRAN) arranged under Long Term Evolution (LTE) for the mobile telecommunications environment in FIG. 3.
Figure 4B:
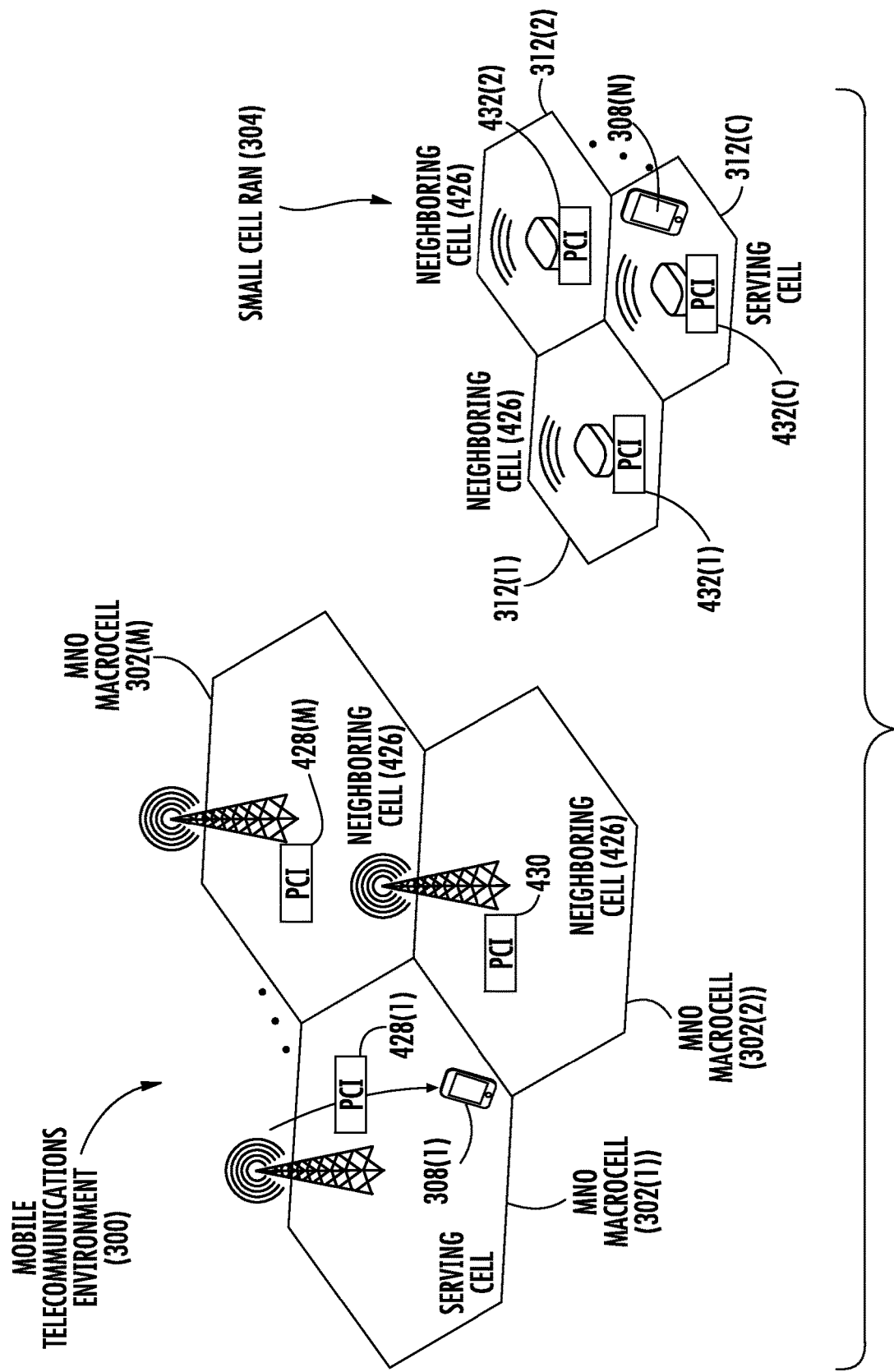

Along with the macrocells 302(1)-302(M), the small cell RAN 304 forms an access network (i.e., an Evolved UMTS Terrestrial Radio Access Network (E-UTRAN)) under 3GPP as represented by reference numeral 400 in FIG. 4A. As shown in FIG. 4A, there is no centralized controller in the E-UTRAN 400, hence an LTE network architecture is commonly said to be "flat." Macrocells 302(1)-302(M) are typically interconnected using an X2 interface 402. The macrocells 302(1)-302(M) are also typically connected to the EPC network 320 by means of an S1 interface 404. More particularly, the macrocells 302(1)-302(M) are connected to a Mobility Management Entity (MME) 406 in the EPC network 320 using an S1-MME interface 408, and to a Serving Gateway (S-GW) 410 using an S1-U interface 412. An S5/S8 interface 414 couples the S-GW 410 to a Packet Data Network Gateway (P-GW) 416 in the EPC network 320 to provide the user mobile communications devices 308(1)-308(N) with connectivity to the Internet 324. A user mobile communications device 308(1)-308(N) can connect to the small cell radio nodes 312(1)-312(C) in the small cell RAN 304 over an LTE-Uu interface 418.

The S1-MME interface 408 is also connected to the MME 406 and S-GW 410 in the EPC network 320 using the appropriate S1 interface connections 404. Accordingly, as each of the small cell radio nodes 312(1)-312(C) in the small cell RAN 304 is operatively coupled to the services node 314 over the LAN connection 316, the communications connections from the small cell radio nodes 312(1)-312(C) are aggregated to the EPC network 320. Such aggregation preserves the flat characteristics of the LTE network while reducing the number of S1 interface connections 404 that would otherwise be presented to the EPC network 320. Thus, the small cell RAN 304 essentially appears as a single eNB 420 to the EPC network 320, as shown. The services node 314 in the small cell RAN 304 includes a central scheduler 422. The small cell radio nodes 312(1)-312(C) may also be configured to support individual schedulers 424.

A user mobile communications device 308 connected to the environment 300 will actively or passively monitor a cell in a macrocell 302(1)-302(M) in the E-UTRAN 400 in the communications range of the user mobile communications device 308 as the user mobile communications device 308 moves throughout the environment 300. As shown in FIG. 4B, such a cell is termed the "serving cell." For example, if user mobile communications device 308 is in communication through an established communications session with a particular small cell radio node 312(1)-312(C) in the small cell RAN 304, the particular small cell radio node 312(1)-312(C) will be the serving cell to the user mobile communications device 308, and the small cell RAN 304 will be the serving RAN. The user mobile communications device 308(1)-308(N) will continually evaluate the quality of a serving cell as compared with that of a neighboring cell 426 in the small cell RAN 304 and/or the macrocells 302(1)-302(M), as shown in FIG. 4B. A neighboring cell 426 is a cell among the small cell RAN 304 and/or macrocells 302(1)-302(M), that is not in control of the active communications session for a given user mobile communications device 308(1)-308(N), but is located in proximity to a serving cell to a user mobile communications device 308(1)-308(N) such that the user mobile communications device 308(1)-308(N) could be in communications range of both its serving cell and the neighboring cell 426. Both small cell radio nodes 312(1)-312(C) and the macrocells 302(1)-302(M) can identify themselves to a user mobile communications device 308(1)-308(N) using a respective unique Physical Cell Identity (PCI) 428(1)-428(M), 430, 432(1)-432(C) (e.g., a public land mobile network (PLMN) identification (ID) (PLMN ID)) that is transmitted over a downlink user mobile communications device 308(1)-308(N). Each of the small cell radio nodes 312(1)-312(C) and the macrocells 302(1)-302(M) can assign a physical channel identity (PCI) that allows user mobile communications device 308(1)-308 (N) to distinguish adjacent cells. As such, the PCIs 428(1)-428(M), 430, 432(1)-432(C) are uniquely assigned among neighboring cells 426, but can be reused across geographically separated cells.

In this regard, aspects disclosed herein include the ability of a serving cell, such as the macrocell 302(1)-302(M) or a small cell radio node 312(1)-312(C) in the small cell RAN 304, to detect and/or measure radio conditions relevant to coexistence with (e.g., potential interference from) a neighboring radio node, which may be in a different radio access system (e.g., a RAN which does not form a part of the same access network). In an exemplary embodiment, one or more of the small cell radio nodes 312(1)-312(C) or radio nodes in the macrocells 302(1)-302(M) can detect and/or measure radio conditions within their respective radio coverage areas, including potential interference from a neighboring radio node (e.g., by detecting the presence of radio communications from the neighboring radio node). Additionally or alternatively, the user mobile communications device(s) 308(1)-308(N) connected to the small cell radio nodes 312(1)-312(C) or radio nodes in the macrocells 302(1)-302(M) can detect and/or measure radio conditions which can indicate potential interference from the neighboring radio node, and report such radio conditions to the small cell radio nodes 312(1)-312(C) or radio nodes in the macrocells 302(1)-302(M). In this regard, as discussed in more detail below, a radio node can detect potential interference from neighboring radio nodes and determine a coexistence status between the radio node and the neighboring radio node (e.g., whether the potential interference is tolerable or intolerable). Determinations of a coexistence status and/or details of the radio conditions may be reported to an arbitrating server, such as described further with respect to FIGS. 5-9.

Figure 5:
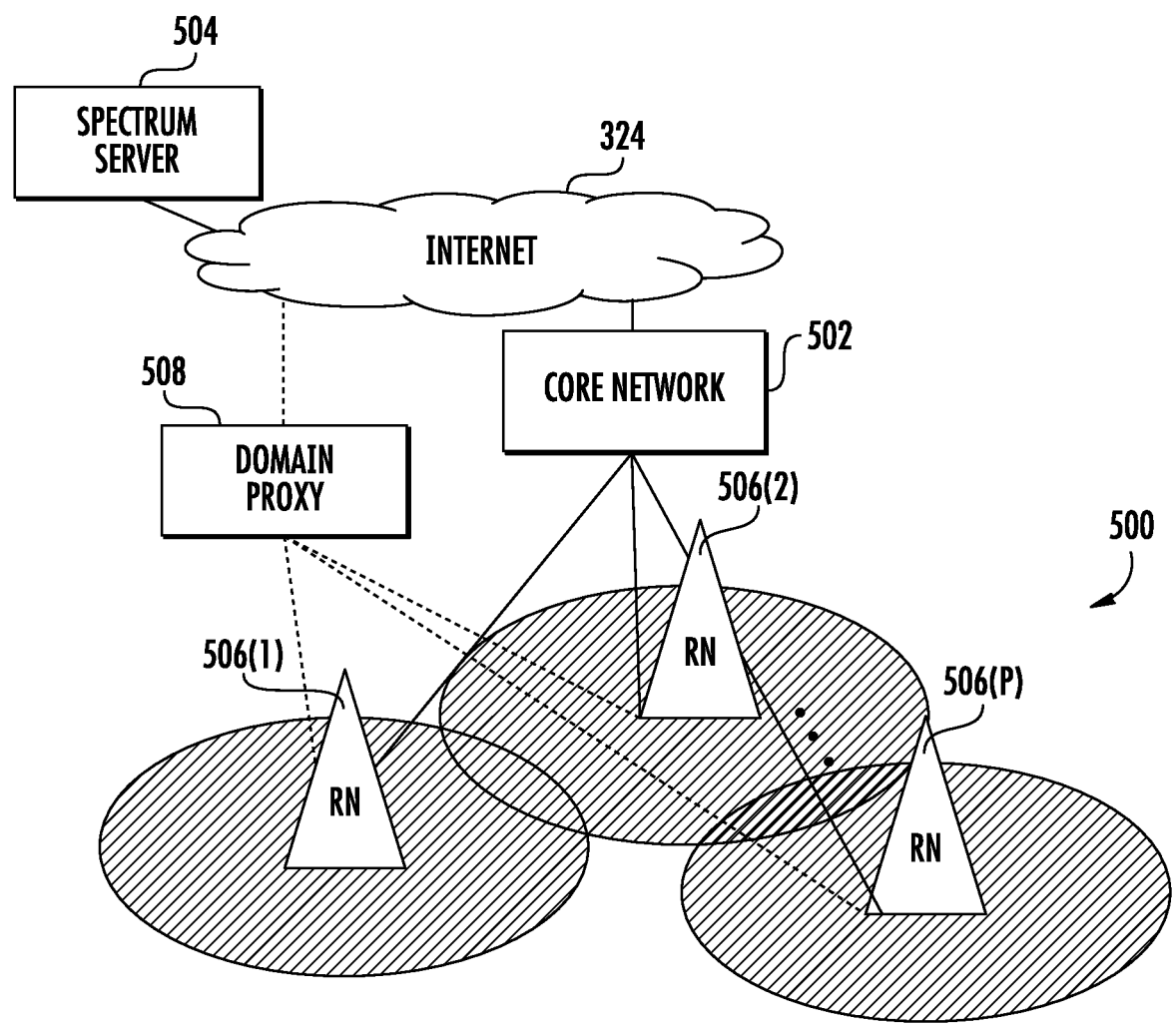
FIG. 5 is a schematic diagram of an exemplary RAN configured to deploy telecommunications services from a core network and including citizens broadband radio service devices (CBSDs) in communication with an arbitrating server to support dynamic allocation of arbitrated spectrum in response to detection of intolerable cross-interference with a neighboring radio node.

In this regard, with reference to FIG. 5, a RAN 500 may incorporate a CBSD configured to operate over the CBRS spectrum. FIG. 5 is a schematic diagram of an exemplary RAN 500 configured to deploy telecommunications services from a core network 502, and including CBSDs in communication with an arbitrating server, such as a spectrum server 504. The arbitrating server (e.g., spectrum server 504) may be part of a SAS 200(1) or it could be a logically separate server such as a coexistence management server (CxM). In some examples there may be more than one spectrum server 504 for supporting dynamic allocation of arbitrated spectrum in response to detection of intolerable cross-interference with a neighboring radio node. The arbitrating server (e.g., spectrum server 504) may be a server which actually performs channel allocations or it may be a server that provides advice, recommendations, or otherwise assists to facilitate channel allocation. The server may also store or otherwise maintain a coexistence status estimate based on coexistence status information received from one or more network entities. The advice may be based on the coexistence status and may be given to the server performing channel allocation, may be provided to the network entities which provide coexistence status information, or the advice may be provided to radio nodes 506(1)-506(P). The RAN 500 and/or one or more radio nodes 506(1)-506(P) in the RAN 500 are generally in communication with the spectrum server 504 in order to seek access to an arbitrated wireless spectrum, such as the CBRS frequency band 100 of FIG. 1C. The spectrum server 504 grants access to the arbitrated wireless spectrum in accordance with a set of access rules. In the example of the CBRS frequency band 100, the spectrum server 504 grants access according to the rules described above with respect to FIGS. 1A-2B. In exemplary embodiments, the spectrum server 504 also arbitrates access so as to avoid interference between the radio nodes 506(1)-506(P) and a neighboring radio node, as described in more detail below in reference to FIGS. 6A-9.

The RAN 500 can include any type of RAN, such as a small cell RAN 304 and/or a macrocell 302(1)-302(M) of FIG. 3. The RAN 500 includes the radio nodes 506(1)-506(P), which may be macrocell radio nodes (e.g., macrocells 302(1)-302(M) in FIGS. 3-4B) and/or small cell radio nodes (e.g., small cell radio nodes 312(1)-312(C) in FIGS. 3-4B), each of which has a radio coverage area to service mobile communications between a user mobile communications device to the core network 502. The core network 502 can include an EPC network 310 as described above with respect to FIGS. 3-4B, through which the RAN 500 is connected to the internet 324.

In an exemplary aspect, radio nodes 506(1)-506(P) in the RAN 500 are communicatively coupled to the spectrum server 504 via the internet 324. In some embodiments, the RAN 500 and/or each radio node 506(1)-506(P) in the RAN 500 is coupled to a domain proxy 508, which centralizes and facilitates communications with the spectrum server 504. In some embodiments, the domain proxy 508 may be part of the RAN 500 and/or be included within a service node 314 (see FIG. 3) or other centralized device within the RAN 500. In other embodiments, the radio nodes 506(1)-506(P) communicate with the spectrum server 504 without the domain proxy 508 (or through multiple domain proxies 508). Through the spectrum server 504, the radio nodes 506(1)-506(P) request access to the arbitrated spectrum, such as the CBRS frequency band. The spectrum server 504, in turn, grants access to portions of the CBRS frequency band based on priority and coexistence status determinations.

In this regard, aspects disclosed herein include the ability of a network entity (e.g., the radio nodes 506(1)-506(P) or the domain proxy 508) associated with the RAN 500 and/or the radio nodes 506(1)-506(P) to detect, measure, and/or receive information regarding radio conditions indicating coexistence with (e.g., potential interference from) a neighboring radio node (which may be in a different RAN, not shown), and reporting of interference information to the spectrum server 504. The coexistence status (which may include a determination of tolerability and/or intolerability with the neighboring radio node) can be reported to the spectrum server 504 directly or through the domain proxy 508 or another intermediary. The spectrum server 504 can allocate, or reallocate, available frequency ranges to the radio nodes 506(1)-506(P) and neighboring radio nodes in order to reduce or avoid intolerable cross-interference and/or enable tolerable cross-interference.

In an exemplary aspect, a radio node 506(1)-506(P) in the RAN 500 is configured to tune its receiver to scan one or more frequency ranges (e.g., bands) to discover potential interference from other neighboring radio nodes in communications range of the radio node 506(1)-506(P). The potential interference is discovered through an appropriate technique, such as scanning and measuring communications signals from neighboring radio nodes within the one or more frequency ranges (e.g., some or the entire CBRS spectrum), measuring the degradation of signals from the radio nodes 506(1)-506(P) or from user mobile communications devices, or through sensors (e.g., an environmental sensor and/or a radio frequency sensor). Any discovered potential interference from neighboring radio nodes can be recorded, and may be reported to the spectrum server 504, such as in a manner discussed below with respect to FIGS. 6A-6B. However, it may be advantageous to the radio node 506(1)-506(P) and/or the RAN 500 to first determine a coexistence status with the neighboring radio node (e.g., whether the potential interference is an intolerable interference, whether the potential interference is tolerable), as described further below with respect to FIGS. 7A-7B. An intolerable interference can be an interference which prevents the radio node 506(1)-506(P) from serving a user mobile communications device(s) within its coverage area according to quality of service (QoS) criteria of the radio node 506(1)-506(P), the RAN 500, or devices served by the RAN 500. The determination of whether detected interference is intolerable may be made by an individual radio node 506(1)-506(P), or the determination may be made elsewhere in the RAN 500 (e.g., at the domain proxy 508, at the service node 314 in FIG. 3, or at another network entity).

In an exemplary aspect, the radio condition indicating potential interference detected by the radio node 506(1)-506(P) and/or the RAN 500 may include an estimated pathloss of transmitted radio signals and/or a reference signal received power estimate caused by a neighboring radio node, which may be within a neighboring RAN. Additionally or alternatively, the detected radio conditions may include an estimation of the amount of degradation to communications of the radio node 506(1)-506(P) caused by the neighboring radio node or caused by user mobile communications devices or other entities wirelessly communicating with the neighboring radio node. These radio conditions may form a basis for determining whether a potential interference is intolerable interference (e.g., whether the radio node does not tolerate operating over shared frequency ranges with the neighboring radio node) or determining whether the potential interference is tolerable interference (e.g., whether the radio node tolerates operating over shared frequency ranges with the neighboring radio node), and in some cases are reported to the spectrum server 504. Reports to the spectrum server may also include additional information, such as information from sensors (e.g., a positioning sensor, an environmental sensor, or a radio frequency sensor).

Figure 6A:
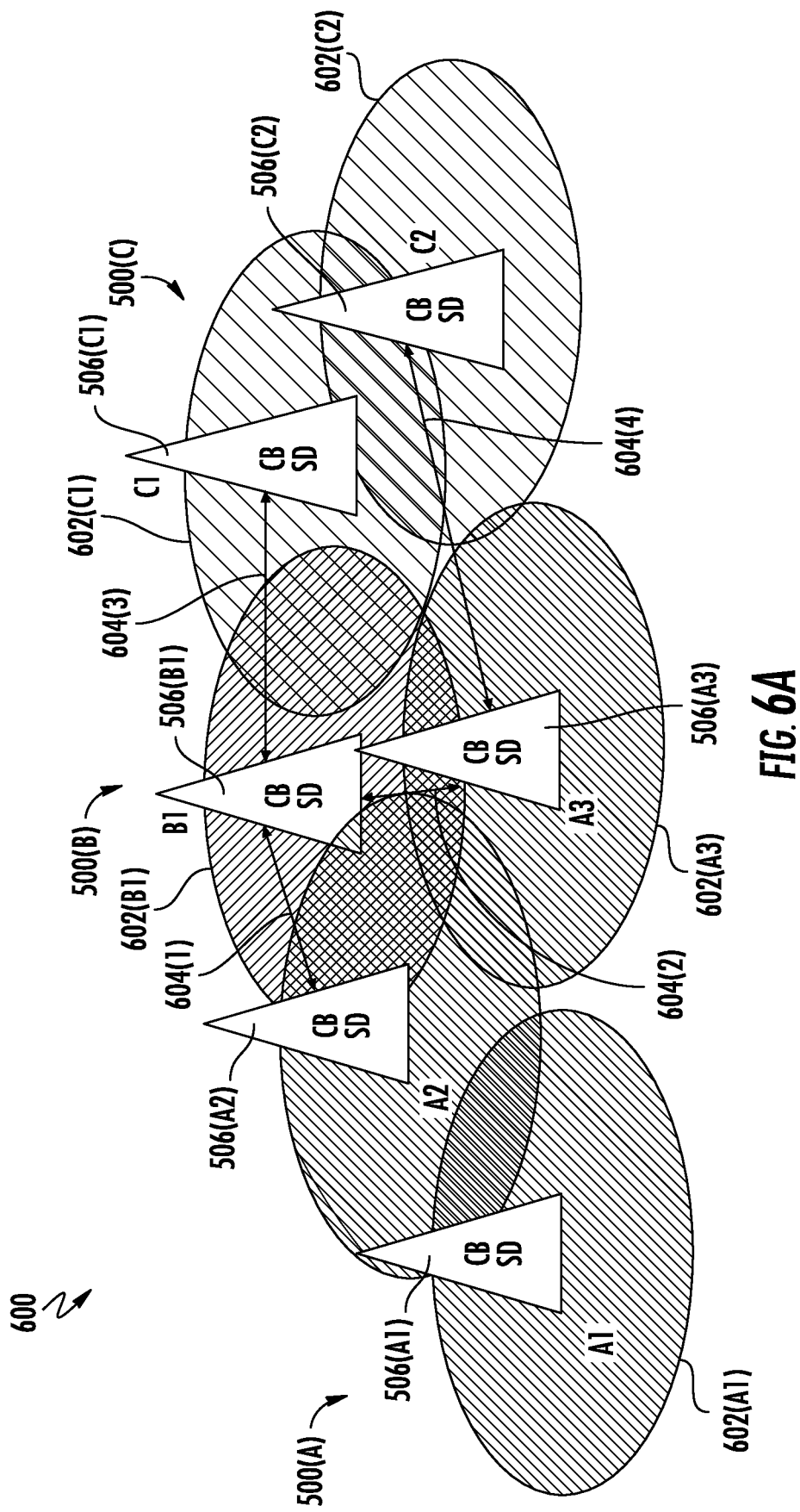
FIG. 6A is a schematic diagram of exemplary cross-interfering radio nodes operating under a spectrum allocation scheme based on cross-interference between the radio nodes.
Figure 6B:
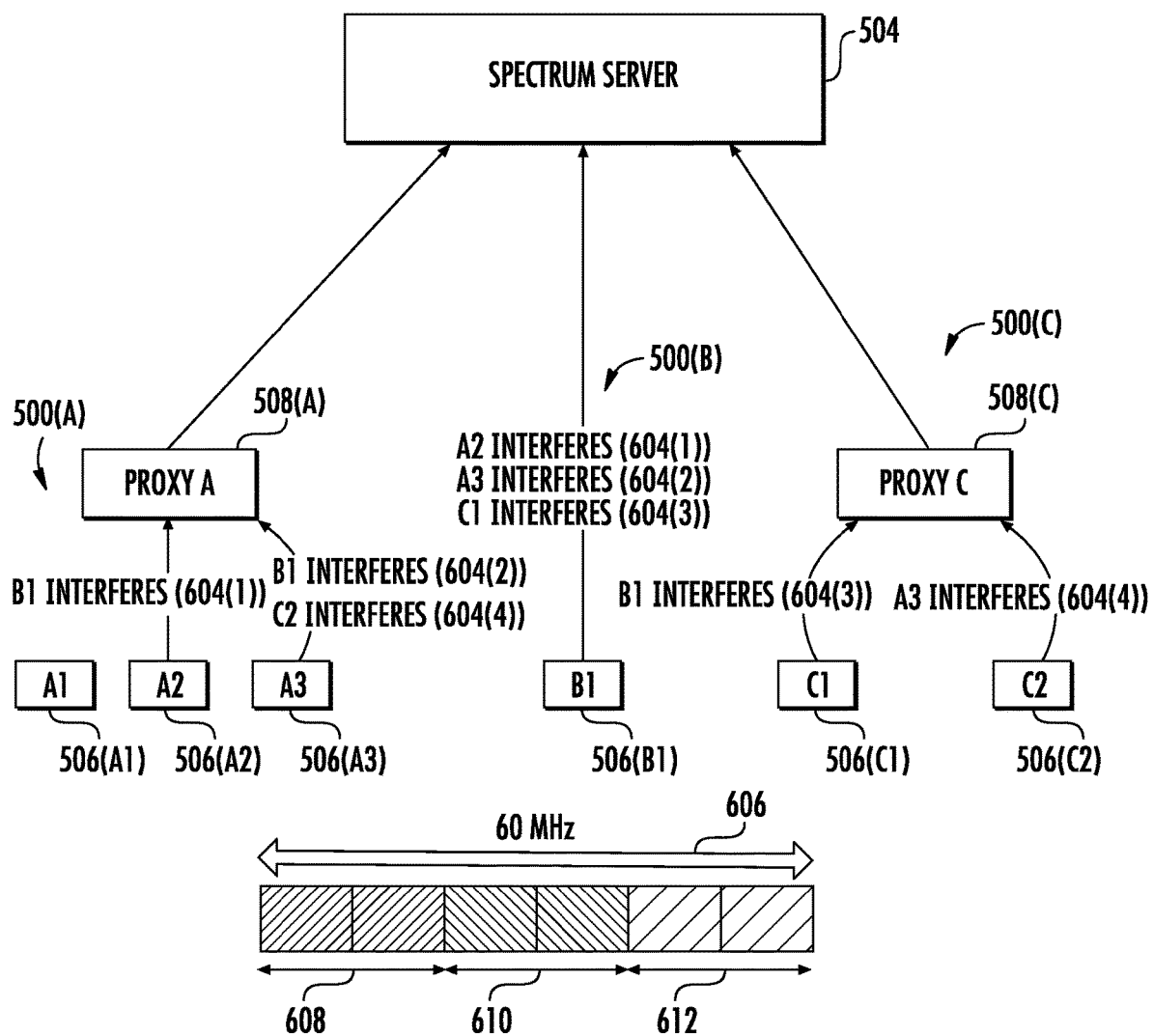
FIG. 6B is a schematic diagram of the cross-interfering radio nodes of FIG. 6A illustrating exemplary messaging with a spectrum server and a resulting spectrum allocation.

In this regard, the spectrum server 504 can receive reports of any potential interference from neighboring radio nodes, as depicted in FIGS. 6A-6B, which may reduce the available spectrum for all radio nodes and/or RANs in an area and/or require the spectrum server 504 to make complex assumptions and determinations regarding the best allocation of spectrum given the reported interference. In aspects disclosed herein, the RAN 500 may instead make a coexistence status determination (e.g., whether the potential interference is tolerable or intolerable) and report the coexistence status to the spectrum server 504, reducing the complexity of the spectrum server 504 and/or improving the amount of spectrum available to the radio node 506(1)-506(P) and neighboring radio nodes, as described further with respect to FIGS. 7A-7B.

FIGS. 6A-6B illustrate example cross-interfering radio nodes 506(A1)-506(C2) in different RANs 500(A)-500(C) and a spectrum allocation scheme based on reporting cross-interference to the spectrum server 504 of FIG. 5B. FIG. 6A is a schematic diagram of exemplary cross-interfering radio nodes 506(A1)-506(C2) operating under a spectrum allocation scheme based on cross-interference between the radio nodes 506(A1)-506(C2). FIG. 6B is a schematic diagram of the cross-interfering radio nodes 506(A1)-506(C2) of FIG. 6A, illustrating exemplary messaging with the spectrum server 504 and a resulting spectrum allocation.

As illustrated in FIG. 6A, a geographical region 600 includes multiple RANs 500(A)-500(C), each of which may incorporate devices configured to access a same arbitrated spectrum. In exemplary aspects, each RAN 500(A)-500(C) incorporates at least one radio node 506(A1)-506(C2) which is a CBSD configured to access the CBRS spectrum as arbitrated by the spectrum server 504. A first RAN 500(A) includes three radio nodes 506(A1)-506(A3) within the geographical region 600, each of which has a corresponding coverage area 602(A1)-602(A3). A second RAN 500(B) neighbors the first RAN 500(A) and includes one radio node 506(B1) within the geographical region 600, with a corresponding coverage area 602(B1). A third RAN 500(C) neighbors the first RAN 500(A) and the second RAN 500(B) and includes two radio nodes 506(C1)-506(C2) within the geographical region 600, each of which has a corresponding coverage area 602(C1)-602(C2).

A potential cross-interference 604 occurs between radio nodes 506(A1)-506(C2) in each of the RANs 500(A)-500(C) within the geographical region 600, as indicated by overlapping coverage areas 602(A1)-602(C2) of the radio nodes 506(A1)-506(C2). While the potential cross-interference 604 is illustrated by overlapping coverage areas in this example, it should be understood that other radio conditions can cause potential cross-interference 604, such as interference caused by user mobile communications devices connected to neighboring RANs 500(A)-500(C).

In the illustrated example, a potential cross-interference 604(1) occurs between the second radio node 506(A2) in the first RAN 500(A) and the radio node 506(B1) in the second RAN 500(B) due to an overlap in their respective coverage areas 602(A2), 602(B1). Similarly, a potential cross-interference 604(2) occurs between the third radio node 506(A3) in the first RAN 500(A) and the radio node 506(B1) in the second RAN 500(B), another potential cross-interference 604(3) occurs between the first radio node 506(C1) in the third RAN 500(C) and the radio node 506(B1) in the second RAN 500(B), and another potential cross-interference 604(4) occurs between the second radio node 506(C2) in the third RAN 500(C) and the third radio node 506(A3) in the first RAN 500(A).

As illustrated in FIG. 6B, these potential interferences 604(1)-604(4) are reported to the spectrum server 504. In some examples, the potential interferences 604(1)-604(4) are first reported to a respective domain proxy 508(A), 508(C) for each RAN 500(A), 500(C), which may simplify messaging between the RANs 500(A), 500(C) and the spectrum server 504 (e.g., the domain proxy 508(A) may report only that there is potential interference between the RAN 500(A) and neighboring RANs 500(B), 500(C), rather than identifying the particular interfering radio nodes 506(B1), 506(C2) and/or reducing duplicated interference information). In other examples, the RAN 500(B) and/or the radio node 506(B1) may report potential interferences 604(1)-604(4) to the spectrum server 504, omitting the domain proxy 508(A), 508(C).

In the exemplary embodiment of FIGS. 6A-6B, the spectrum server 504 operates under a spectrum allocation scheme based on the radio nodes 506(A1)-506(C2) in the RANs 500(A)-500(C) reporting cross-interference 604 to the spectrum server 504, and the spectrum server 504 allocating spectrum to avoid this cross-interference 604. In an exemplary aspect, the spectrum server 504 may have a 60-MHz block 606 of spectrum available to allocate among the RANs 500(A)-500(C). As previously described, a potential cross-interference 604 occurs between each of the RANs 500(A)-500(C) within the geographical region 600, and as a consequence, none of the RANs 500(A)-500(C) can share frequency bands within the 60-MHz block 606. Accordingly, the spectrum server 504 allocates a first 20-MHz block 608 to the radio nodes 506(A1)-506(A3) in the first RAN 500(A), a second 20-MHz block 610 to the radio node 506(B1) in the second RAN 500(B), and a third 20-MHz block 612 to the radio nodes 506(C1)-506(C2) in the third RAN 500(C). Such an allocation of the available spectrum may be unnecessarily restrictive, reducing the amount of bandwidth available to each of the RANs 500(A)-500(C).

Figure 7A:
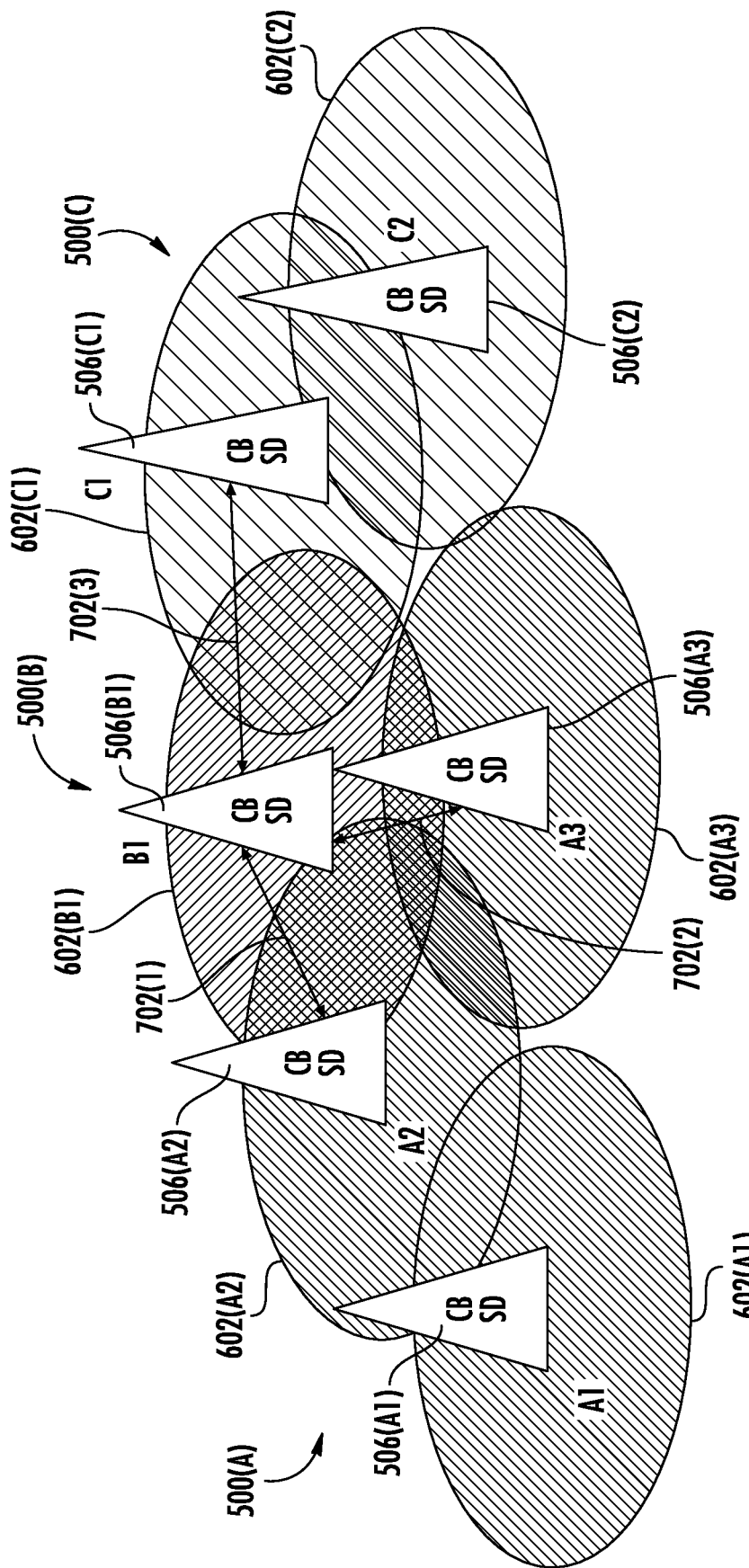
FIG. 7A is a schematic diagram of the exemplary cross-interfering radio nodes of FIG. 6A operating under an exemplary spectrum allocation scheme based on intolerability determinations.
Figure 7B:
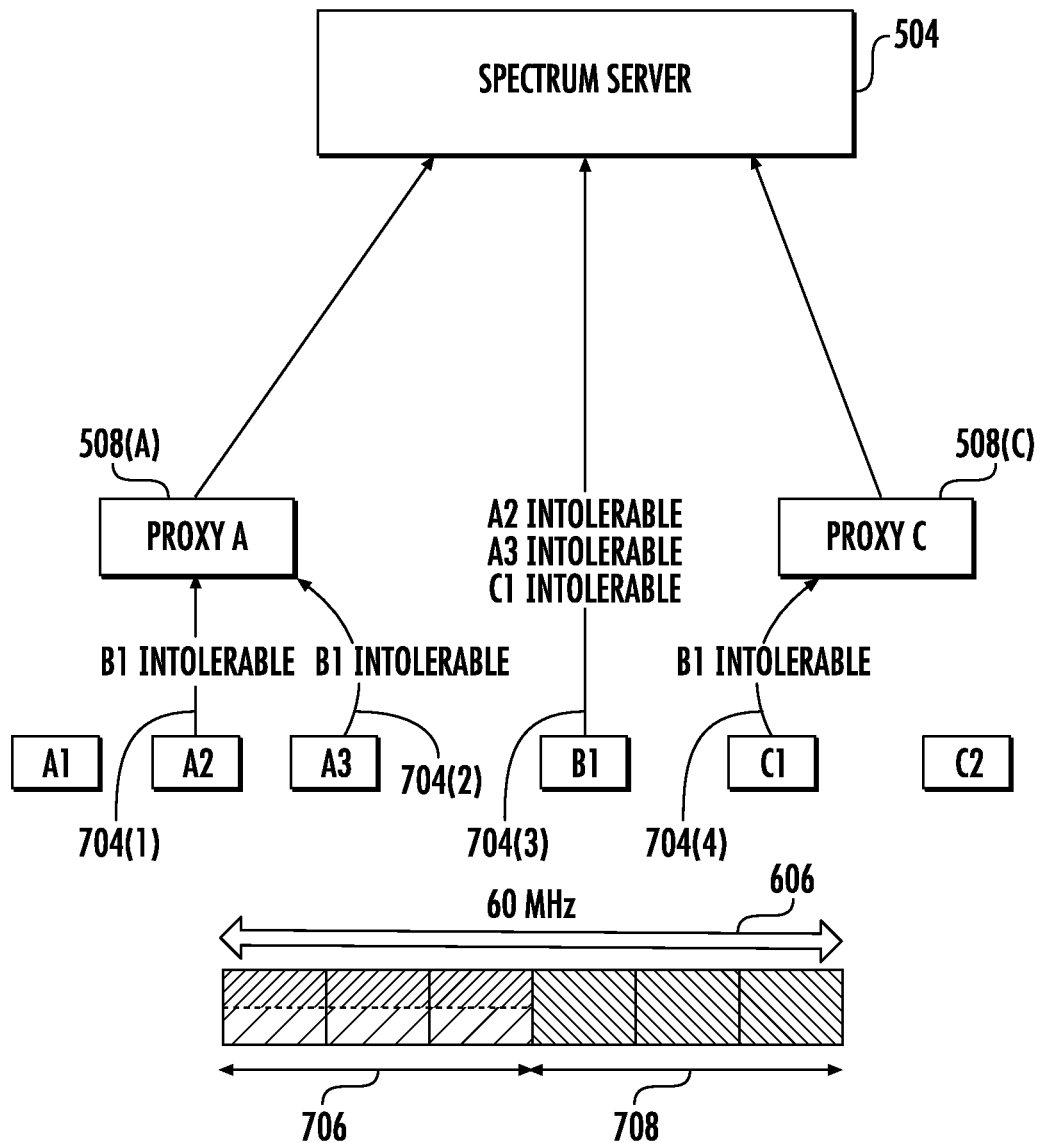
FIG. 7B is a schematic diagram of the cross-interfering radio nodes of FIG. 7A illustrating exemplary messaging with a spectrum server and a resulting spectrum allocation.

In this regard, in exemplary aspects, the RANs 500(A)-500(C), the radio nodes 506(A1)-506(C2), and the spectrum server 504 may operate under a spectrum allocation scheme based on coexistence status determinations, such as intolerability determinations, as illustrated in FIGS. 7A-7B. FIG. 7A is a schematic diagram of the exemplary cross-interfering radio nodes 506(A1)-506(C2) of FIG. 6A operating under an exemplary spectrum allocation scheme based on intolerability determinations. FIG. 7B is a schematic diagram of the cross-interfering radio nodes 506(A1)-506(C2) of FIG. 7A, illustrating exemplary messaging with the spectrum server 504 of FIG. 5 and a resulting spectrum allocation.

As illustrated in FIG. 7A, rather than report only potential cross-interference, the RANs 500(A)-500(C) and/or the radio nodes 506(A1)-506(C2) can first determine a coexistence status, such as whether the potential cross-interference is an intolerable interference. A coexistence status indicates whether two radio nodes 506(A1)-506(C2), each of which may in some examples be in a different RAN 500(A)-500(C), are able to operate over shared RF frequencies. In a first aspect, the coexistence status includes an intolerability determination, in which a network entity (e.g., a first radio node, such as 506(A2), or a domain proxy 508) determines that the first radio node (e.g., 506(A2)) does not tolerate operating over shared RF frequencies with a second radio node (e.g., 506(B1)). The intolerability determination may be based on an actual, estimated, or assumed inability for the first radio node (e.g., 506(A2)) to tolerate operating over shared RF frequencies. In another aspect, the coexistence status includes a tolerability determination, in which the network entity determines that the first radio node (e.g., 506(A2)) tolerates operating over shared RF frequencies with the second radio node (e.g., 506(B1)). In some aspects, the coexistence status can include tolerability and intolerability determinations, in which the first network entity determines that the first radio node (e.g., 506(A2)) tolerates operating over shared RF frequencies with a third radio node (e.g., 506(C1)), but it cannot tolerate operating over shared RF frequencies with the second radio node (e.g., 506(B1)).

An intolerable interference can also be cross-interference which prevents a radio node 506(A1) from serving user mobile communications devices within its coverage area 602(A1) according to QoS criteria of the radio node 506(A1), the RAN 500(A), or devices served by the RAN 500(A). In an exemplary aspect, the second radio node 506(A2) in the first RAN 500(A) is a serving cell which includes processing circuitry which can detect a radio condition indicating potential interference with the radio node 506(B1) in the second RAN 500(B), as indicated by their overlapping coverage areas 602(A2), 602(B1). The processing circuitry in the radio node 506(A2) and/or processing circuitry in another network entity (e.g., a domain proxy 508) can also determine a coexistence status based on an analysis of the radio condition, for example whether the potential interference is intolerable interference. The coexistence status is then transmitted to the spectrum server 504. For example, when the potential interference is determined to be intolerable interference, the processing circuitry in the radio node 506(A2) and/or processing circuitry in another network entity causes the second radio node 506(A2) in the first RAN 500(A) to transmit an intolerability declaration (e.g., an indication of the coexistence status) to the spectrum server 504 (e.g., via a communication interface circuit), as further described below.

In this regard, the processing circuitry of a radio node 506(A1)-506(C2) and/or processing circuitry in another network entity can determine a coexistence status (e.g., whether the potential interference is intolerable interference) based on measurements made by the radio node 506(A1)-506(C2), based on input from sensors (e.g., a positioning sensor, an environmental sensor, or a radio frequency sensor), or based on measurements made by a user mobile communications device connected to the radio node 506(A1)-506(C2). While making this coexistence status determination (e.g., intolerability determination), the processing circuitry may analyze criteria such as an estimated pathloss, an estimation of the amount of degradation caused by a neighboring radio node 506(A1)-506(C2), or an estimation of the amount of degradation caused by a mobile device connected to the neighboring radio node 506(A1)-506(C2). In some embodiments, the coexistence status determination (e.g., intolerability determination) may also take into account whether transmitting the indication of the coexistence status (e.g., the intolerability declaration) would result in a more favorable allocation of the radio frequency ranges compared to not transmitting the indication of the coexistence status (e.g., the intolerability declaration). The coexistence status determination (e.g., intolerability determination) is generally made based on a potential cross-interference 604. That is to say, the radio nodes 506(A1)-506(C2) and/or other network entity need not find an actual, present interference by the neighboring radio node 506(A1)-506(C2). Rather, it may be assumed for the coexistence status determination (e.g., intolerability determination) that the radio node 506(A1)-506(C2) and/or RAN 500(A)-500(C) and the neighboring radio node 506(A1)-506(C2) and/or RAN 500(A)-500(C) occupy a same radio frequency range of the arbitrated spectrum (e.g., the CBRS spectrum), even if such occupying the same radio frequency range is not currently occurring.

Accordingly, in an exemplary aspect the second radio node 506(A2) in the first RAN 500(A) can determine that the radio node 506(B1) in the second RAN 500(B) causes an intolerable interference 702(1) according to QoS criteria (indicated by the amount of overlap in their respective coverage areas 602(A2), 602(B1)). Similarly, the third radio node 506(A3) in the first RAN 500(A) can determine that the radio node 506(B1) in the second RAN 500(B) causes an intolerable interference 702(2), and the first radio node 506(C1) in the third RAN 500(C) can determine that the radio node 506(B1) in the second RAN 500(B) causes an intolerable interference 702(3). However, the second radio node 506(C2) in the third RAN 500(C) can determine that, although the third radio node 506(A3) in the first RAN 500(A) interferes, the interference is tolerable. It should be understood that for each of these examples, the potential interference may be mutual between any two radio nodes 506(A1)-506(C2), such that both radio nodes 506(A1)-506(C2) would make the same determination.

As illustrated in FIG. 7B, these coexistence status determinations (e.g., intolerable interferences 702(1)-702(3)) result in the transmission of indications of the coexistence status (e.g., intolerability declarations 704(1)-704(4)) to the spectrum server 504. In some examples, the indications of the coexistence status (e.g., intolerability declarations 704(1)-704(4)) are made by or transmitted to a respective domain proxy 508(A), 508(C) for each RAN 500(A), 500(C), which may simplify messaging between the RANs 500(A), 500(C) and the spectrum server 504 (e.g., the domain proxy 508(A) may consolidate the intolerability declarations 704(1), 704(2) into a single transmission to the spectrum server 504). In other examples, the RAN 500(B) and/or the radio node 506(B1) may transmit indications of the coexistence status (e.g., intolerability declarations 704(1)-704(4)) to the spectrum server 504, omitting the domain proxy 508(A), 508(C).

In the exemplary embodiment of FIGS. 7A-7B, the spectrum server 504 operates under a spectrum allocation scheme based on the radio nodes 506(A1)-506(C2) transmitting indications of a coexistence status (e.g., intolerability declarations 704(1)-704(4)) to the spectrum server 504, and the spectrum server 504 allocating spectrum to avoid this cross-interference. In an exemplary aspect, the spectrum server 504 may have a 60-MHz block 606 of spectrum available to allocate among the RANs 500(A)-500(C). As previously described, intolerable interference occurs between the radio nodes 506(A2), 506(A3) in the first RAN 500(A) and the radio node 506(B1) in the second RAN 500(B), and between the radio node 506(B1) in the second RAN 500(B) and a radio node 506(C1) in the third RAN 500(C). As a consequence, while the second RAN 500(B) cannot share frequency bands with either of the other RANs 500(A), 500(C), the first RAN 500(A) and the third RAN 500(C) can share frequency bands within the 60-MHz block 606. Accordingly, the spectrum server 504 allocates a first 30-MHz block 706 to be shared by the radio nodes 506(A1)-506(A3) in the first RAN 500(A) and the radio nodes 506(C1)-506(C2) in the third RAN 500(C), and allocates a second 30-MHz block 708 to the radio node 506(B1) in the second RAN 500(B). Thus, under the spectrum allocation scheme based on intolerability determinations of FIGS. 7A-7B, each of the radio nodes 506(A1)-506(C2) in the RANs 500(A)-500(C) may gain access to a larger amount of spectrum than under the spectrum allocation scheme based on reporting cross-interference of FIGS. 6A-6B.

In a further example, the coexistence status can include one or more tolerability determinations (e.g., in addition to or instead of the intolerability determinations), in which the radio nodes 506(A1)-506(C2) and/or another network entity can determine whether a neighboring radio node 506(A1)-506(C2) is tolerable. The radio nodes 506(A1)-506(C2) and/or another network entity can further transmit tolerability declarations to the spectrum server 504. In some cases, the indication of the coexistence status can include additional information regarding the detected radio condition, such as an indication of a degree of interference, or characteristics such as an estimated pathloss, a reference signal received power estimate, an estimation of the amount of degradation caused by a radio node 506(A1)-506(C2) in a neighboring RAN 500(A)-500(C), a numerical value indicating an estimated level of tolerability, a numerical value indicating an estimated level of intolerability, or an estimation of the amount of degradation caused by a mobile device connected to the neighboring RAN 500(A)-500(C). In some cases, the indication of the coexistence status includes identifying information of the neighboring radio node, for example a cell identity, an identity of the neighboring radio node, or a physical cell identity.

The exemplary embodiments of FIGS. 6A-7B are depicted with three neighboring RANs 500(A)-500(C) operating within a geographical region 600. It should be understood that in other embodiments, a RAN 500 may be deployed in a geographical region 600 having more or fewer neighboring RANs 500(A)-500(C). In addition, in some embodiments, when the spectrum server 504 receives an intolerability declaration 704(1)-704(4), the spectrum server 504 may consider each intolerability declaration 704(1)-704(4) to be bidirectional, and allocate the available spectrum accordingly. In other embodiments, an intolerability declaration 704(1)-704(4) may be considered unidirectional.

Figure 8:
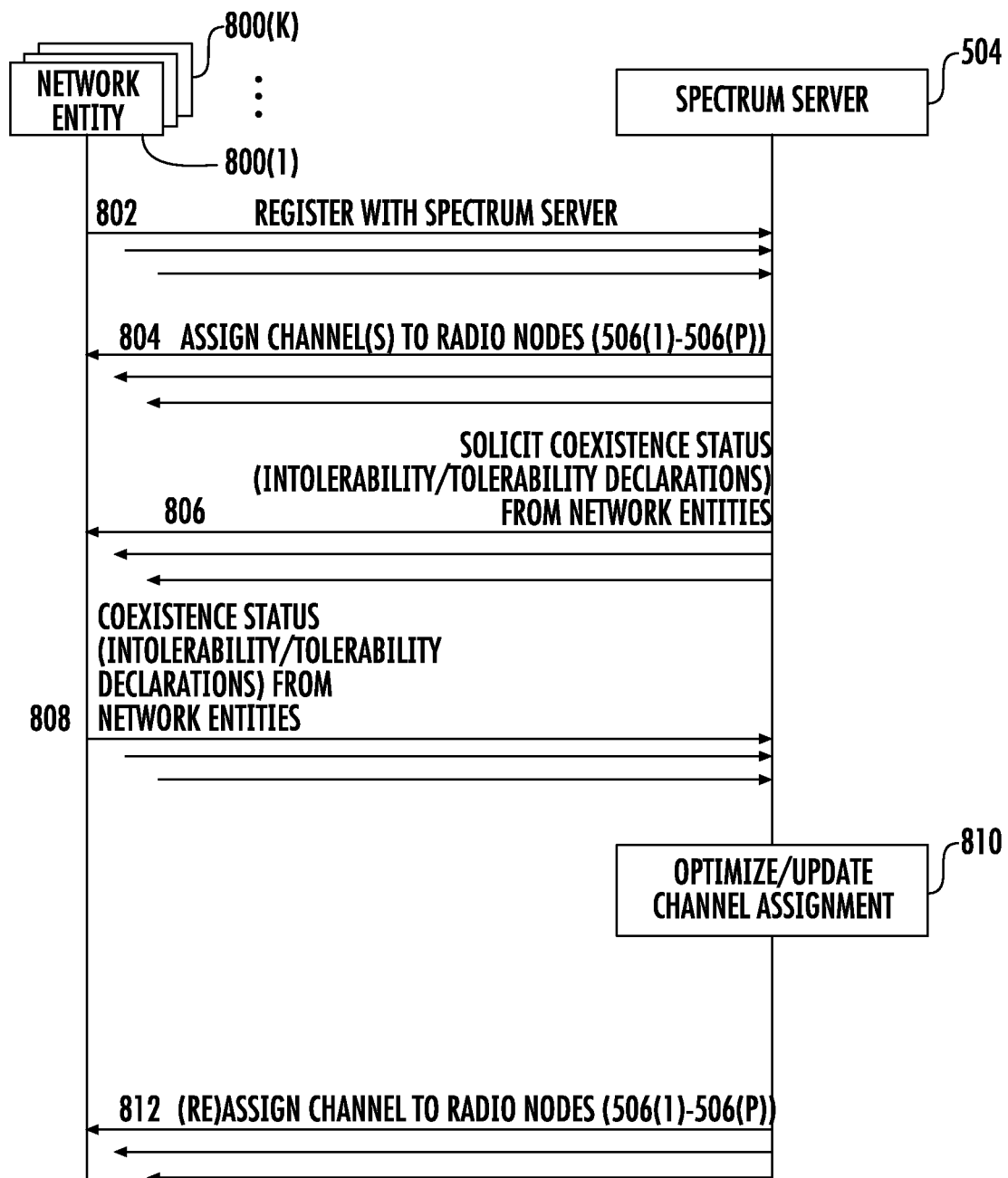
FIG. 8 is a flow diagram illustrating an exemplary process of radio nodes indicating a coexistence status, including tolerability and/or intolerability declarations, and resulting reallocation of spectrum among the radio nodes such as depicted in FIGS. 7A and 7B.

FIG. 8 is a flow diagram illustrating an exemplary process of radio nodes indicating a coexistence status, including tolerability and/or intolerability declarations, and resulting reallocation of spectrum among the radio nodes such as depicted in FIGS. 7A and 7B. With reference to FIGS. 5, 7A-7B, and 8, a RAN 500 includes one or more radio nodes 506(1)-506(P) configured to operate over an arbitrated spectrum, such as the CBRS frequency band. In this regard, one or more network entities (e.g., a radio node 506(1)-506(P) or domain proxy 508) associated with the neighboring RANs 500(A)-500(C) in a geographical region 600 can communicate with an arbitrating server, such as the spectrum server 504, to gain radio access to frequency ranges in the arbitrated spectrum (e.g., the CBRS frequency band). In this regard, as shown in FIG. 8, network entities 800(1)-800(K) register with the spectrum server 504 to seek radio access to the arbitrated spectrum (step 802). The spectrum server 504 then assigns one or more channels (e.g., frequency ranges), if available, to each of the radio nodes 506(1)-506(P) (step 804). For example, the spectrum server 504 can initially assign access to some or all channels of the CBRS frequency band to solicit radio condition determinations and/or reports from the network entities 800(1)-800(K), or the channels can be assigned until the spectrum server 504 receives coexistence status information from the network entities 800(1)-800(K). The spectrum server 504 then solicits coexistence status (e.g., intolerability declarations 704(1)-704(4) and/or tolerability declarations) from the network entities 800(1)-800(K) (step 806).

Each of the network entities 800(1)-800(K) detects, measures, and/or receives information about radio conditions, which may indicate potential interference with neighboring radio nodes 506(1)-506(P). If potential interference is detected, the network entity 800(1)-800(K) makes a coexistence status determination (e.g., determines whether the potential interference is intolerable interference or tolerable interference) based on an analysis of the radio conditions. The network entities 800(1)-800(K) transmit an indication of the coexistence status determination (which may include an intolerability declaration 704(1)-704(4) and/or a tolerability declaration) to the spectrum server 504 (step 808). After receiving any coexistence status (e.g., intolerability declarations 704(1)-704(4) and/or tolerability declarations), the spectrum server 504 assigns and/or reassigns channels to the radio nodes 506(1)-506(P) (block 810). The updated channel assignments are then transmitted to the radio nodes 506(1)-506(P) (block 812). It should be understood with respect to FIG. 8 that some embodiments may not perform all of the operations depicted.

Figure 9:
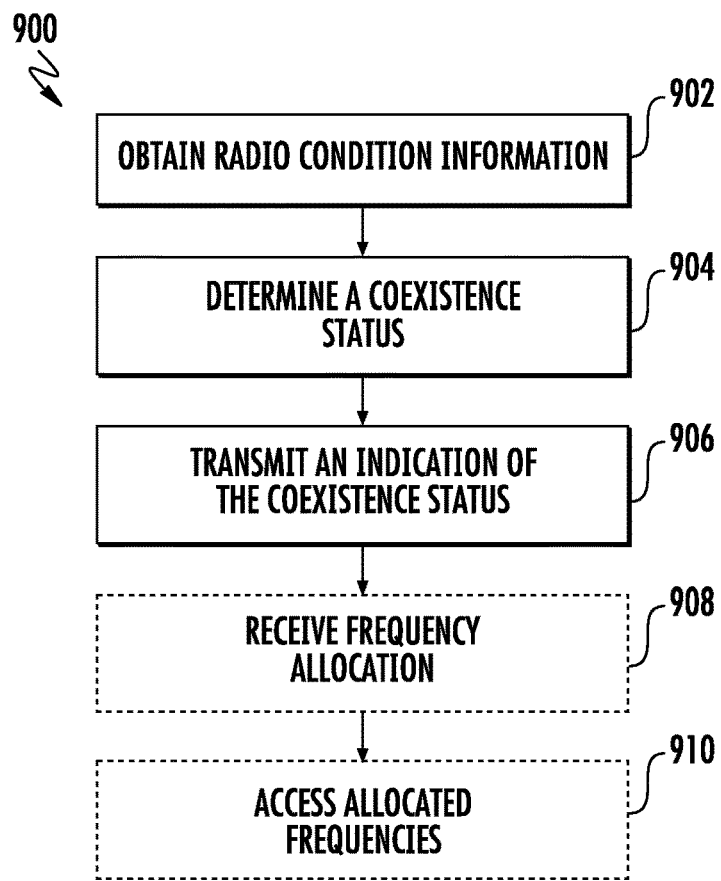
FIG. 9 is a flowchart illustrating an exemplary process for reporting coexistence status between radio nodes to a spectrum server.

FIG. 9 is a flowchart illustrating an exemplary process 900 for reporting coexistence status between radio nodes to a spectrum server. The process 900 comprises obtaining radio condition information (block 902), which can include detecting a radio condition indicating potential interference between a first radio node (e.g., 506(A2)) and a second radio node (e.g., 506(B1)). The process 900 also comprises determining a coexistence status between a first radio node (e.g., 506(A2)) and a second radio node (e.g., 506(B1)) based on the detected radio condition (block 904). In some examples, determining the coexistence status includes determining whether the potential interference is intolerable interference based on the detected radio condition. The process 900 also comprises transmitting an indication of the coexistence status to a spectrum server 504 (block 906). In some examples, transmitting the indication of the coexistence status includes transmitting an intolerability declaration 704(1)-704(4) to a server (e.g., the spectrum server 504) in response to the determined potential interference indicating intolerable interference.

In some cases, the exemplary process 900 can include additional operations, though they may not be necessary. For example, the process can also comprise receiving an allocation of a first radio frequency range of a plurality of radio frequency ranges in response to the transmitted intolerability declaration 704(1)-704(4) (block 908). The allocation of the first radio frequency range may be received from the spectrum server 504. The process 900 can also comprise accessing the first radio frequency range of the plurality of radio frequency ranges in accordance with the allocation (block 910). That is, a serving cell (e.g., a radio node 506(1)-506(P)) in a RAN 500(A)-500(C) can transmit and receive radio communications with user mobile communications devices over the allocated first radio frequency range (e.g., channel or set of channels).

Figure 10:
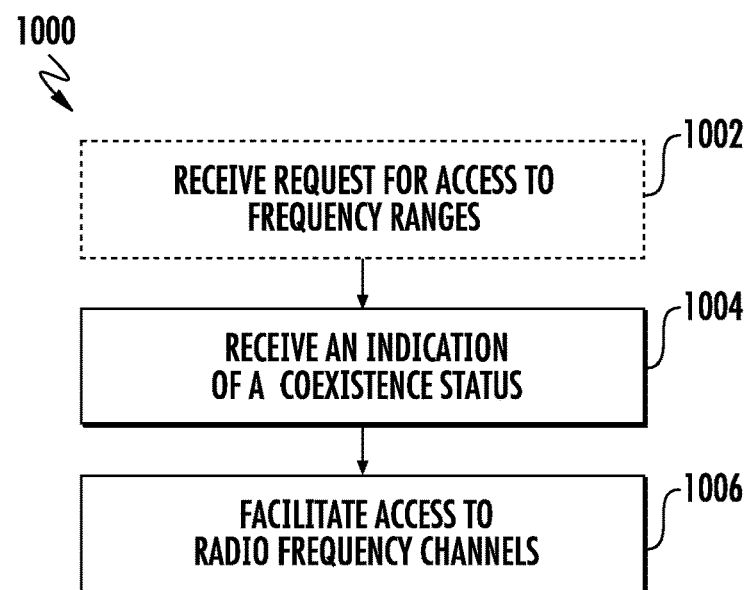
FIG. 10 is a flowchart illustrating an exemplary process for facilitating access to a plurality of radio frequency channels.

FIG. 10 is a flowchart illustrating an exemplary process 1000 for facilitating access to a plurality of radio frequency channels. The process 1000 can comprise receiving a request for access to the plurality of frequency ranges (e.g., frequency channels in the CBRS band) from a plurality of RANs 500(A)-500(C) (block 1002), though this is not necessary. The process 1000 also comprises receiving from a network entity (e.g., 800(1)) an indication of a coexistence status between a first radio node (e.g., 506(A2)) associated with the network entity (e.g., 800(1)) and a second radio node (e.g., 506(B1)) (block 1004). In some cases, receiving the indication of the coexistence status can include receiving one or more intolerability declarations 704(1)-704(4), each intolerability declaration 704(1)-704(4) indicating an intolerable interference between a respective first RAN and a respective second RAN of the RANs 500(A)-500(C). The process 1000 also comprises facilitating access to a plurality of radio frequency channels based on the indication of the coexistence status (block 1006). In some cases, facilitating access includes dividing access to the plurality of radio frequency ranges among the plurality of RANs 500(A)-500(C) such that for each intolerability declaration the intolerable interference is avoided.

Figure 11:
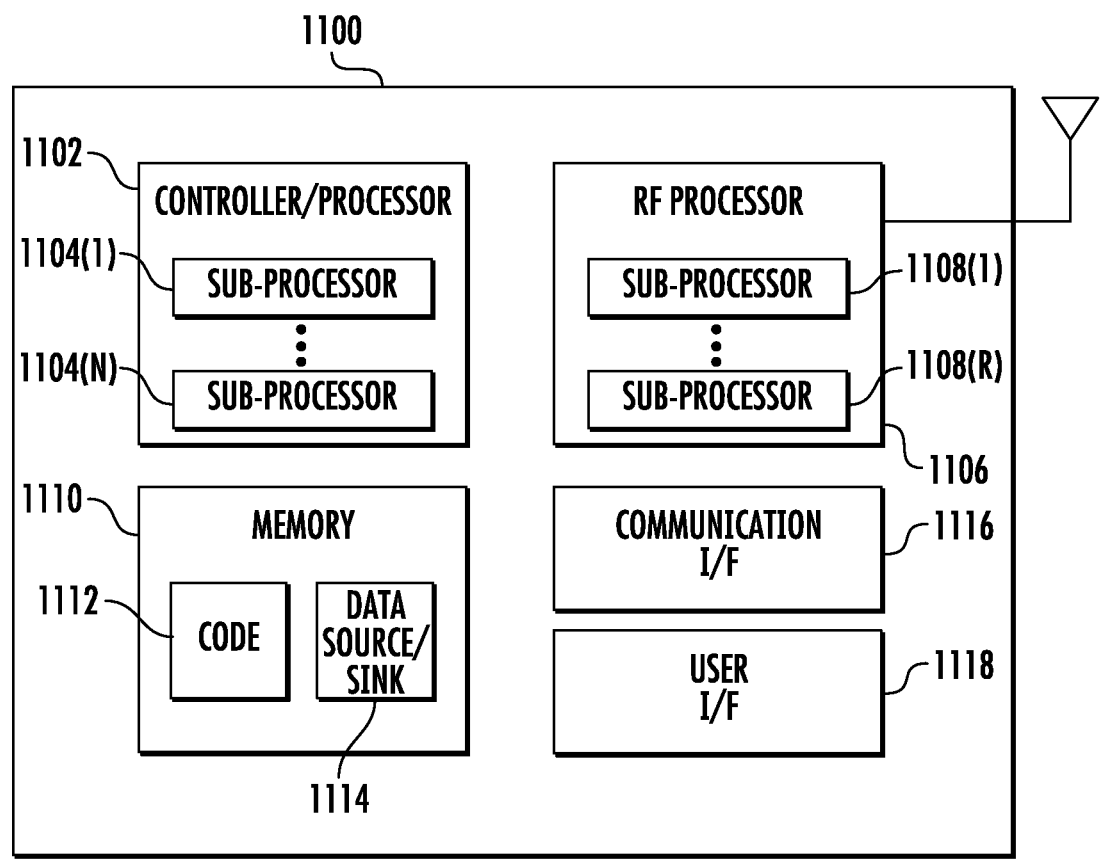
FIG. 11 is a schematic diagram of an exemplary computer system that can be implemented for a radio cell or another network entity and/or a spectrum server that may facilitate dynamically allocating spectrum among radio nodes based on determining and transmitting a coexistence status.

FIG. 11 shows a simplified functional block diagram 1100 of an illustrative computer system for a radio node 506(1)-506(P) or another network entity 800(1)-800(K) and/or a spectrum server 504 that may facilitate dynamically allocating spectrum among radio nodes 506(1)-506(P) based on determining and transmitting a coexistence status. A radio node 506(1)-506(P) in a RAN 500 is configured to scan one or more frequency ranges (e.g., bands) to discover potential interference from neighboring radio nodes. A controller/processor 1102 typically handles high level processing. The controller/processor 1102 may include one or more sub-processors 1104(1)-1104(N) or cores that are configured to handle specific tasks or functions. An RF processor 1106 implements various signal processing functions for the downlink including the lower level L1 processing. The RF processor 1106 may include one or more sub-processors 1108(1)-1108(R) or cores that are configured to handle specific tasks or functions. A memory 1110 is a computer-readable medium that stores computer-readable code 1112 that is executable by one or more processors including the controller/processor 1102 and/or the RF processor 1106. The memory 1110 may also include various data sources and data sinks (collectively represented by element 1114) that may provide additional functionalities.

The code 1112 in typical deployments is arranged to be executed by the one or more processors to facilitate the discovery of a neighbor radio access system or cells reporting to a serving RAN. The code 1112 additionally enables implementation of both the dedicated PCI identity and common PCI identity using the same hardware infrastructure in a given dual identity cell when executed. The hardware infrastructure may also include various interfaces (I/Fs) including a communication I/F 1116, which may be used, for example, to implement a link to the services node 314 (FIG. 3), LAN, an arbitrating server (e.g., the spectrum server 504), a RAN 500 and/or radio node 506(1)-506(P), or to an external processor, control, or data source. In some cases, a user I/F 1118 may be utilized to provide various indications such as power status or to enable some local control of features or settings. It is noted that the block diagram 1100 may also be substantially applicable to another network entity 800(1)-800(K), such as a domain proxy 508 and/or a spectrum server 504. More particularly, the RF processor 1106 may be eliminated in some applications and any functionality that it provides that is needed to implement the services node 314 may be provided by the controller/processor 1102.

While the computer-readable medium is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method of requesting access to a shared radio frequency spectrum, the method comprising:
   detecting a radio condition indicating potential interference within the shared radio frequency spectrum between one or more user devices connected to a first radio access network (RAN) and a second RAN;
   making a coexistence determination whether the potential interference is tolerable interference for the one or more user devices or intolerable interference for at least one of the one or more user devices based on the detected radio condition;

transmitting an intolerability declaration to a server in response to the coexistence determination indicating the potential interference is intolerable interference across the shared radio frequency spectrum for the at least one of the one or more user devices and not transmitting the intolerability declaration to a server in response to the coexistence determination indicating the potential interference is tolerable interference across the shared radio frequency spectrum for the at least one of the one or more user devices; and receiving an allocation of a first radio frequency range of the shared radio frequency spectrum in response to transmitting the intolerability declaration.

2. The method of claim 1, further comprising accessing the first radio frequency range of the shared radio frequency spectrum in accordance with the allocation of the first radio frequency range;

wherein the shared radio frequency spectrum is within a citizens broadband radio service (CBRS) frequency range.

3. The method of claim 1, wherein the radio condition is based on at least one of measurements made by a first radio node in the first RAN or measurements made by a first user device connected to the first RAN.

4. The method of claim 3, wherein the radio condition comprises at least one of an estimated pathloss, an estimation of an amount of degradation caused by a second radio node in the second RAN, or an estimation of an amount of degradation caused by a second user device connected to the second RAN.

5. The method of claim 1, wherein the coexistence determination is further based on whether transmitting the intolerability declaration would result in a more favorable allocation of the shared radio frequency spectrum compared to not transmitting the intolerability declaration.

6. The method of claim 1, wherein the determining whether the potential interference is intolerable interference is further based on the first RAN and the second RAN occupying a same radio frequency range of the shared radio frequency spectrum even if such occupying the same radio frequency range is not currently occurring.

7. The method of claim 1, wherein the intolerability declaration comprises additional information based on the detected radio condition.

8. The method of claim 7, wherein the additional information comprises at least one of a degree of intolerability, a distance between a first radio node in the first RAN and a second radio node in the second RAN, an estimated pathloss, an estimation of an amount of degradation caused by the second radio node, or an estimation of an amount of degradation caused by a second user device connected to the second RAN.

9. The method of claim 1, further comprising transmitting an interfering but tolerable declaration to the server in response to the coexistence determination indicating the potential interference is tolerable interference for the one or more user devices;

wherein the interfering but tolerable declaration comprises an indication of a degree of interference based on the detected radio condition.

10. The method of claim 1, wherein the coexistence determination is further based on locations of the one or more user devices relative to the second RAN.

11. The method of claim 10, wherein the coexistence determination indicates tolerable interference when none of the one or more user devices connected to the first RAN is located within a region experiencing the potential interference with the second RAN.

* * * * *